(12) United States Patent
Russell

(10) Patent No.: US 7,874,403 B2
(45) Date of Patent: Jan. 25, 2011

(54) LUBRICATION SYSTEM FOR PIN CONNECTIONS

(76) Inventor: Larry Rayner Russell, 3607 Gramercy, Houston, TX (US) 77025

( * ) Notice: Subject to any disclaimer, the term of this patent is extended or adjusted under 35 U.S.C. 154(b) by 1203 days.

(21) Appl. No.: 11/368,227

(22) Filed: Mar. 4, 2006

(65) Prior Publication Data

US 2006/0219481 A1     Oct. 5, 2006

Related U.S. Application Data

(63) Continuation-in-part of application No. 11/344,727, filed on Feb. 1, 2006, now Pat. No. 7,527,450.

(60) Provisional application No. 60/659,702, filed on Mar. 8, 2005, provisional application No. 60/660,404, filed on Mar. 10, 2005.

(51) Int. Cl.
*F16N 1/00* (2006.01)
*E02B 17/08* (2006.01)
*B63B 35/44* (2006.01)

(52) U.S. Cl. ............................ 184/5; 114/265; 405/202; 286/291; 184/5.1

(58) Field of Classification Search ............... 184/5, 184/5.1, 6.17, 6.19, 100, 101; 403/39, 31, 403/36, 150, 324, 40, 288; 114/264; 405/1–228; 384/286, 291
See application file for complete search history.

(56) References Cited

U.S. PATENT DOCUMENTS

| 4,136,633 | A | * | 1/1979 | Homer et al. | 114/264 |
| 4,257,775 | A | | 3/1981 | Ladov et al. | |
| 4,455,108 | A | * | 6/1984 | Lausberg | 405/202 |
| 4,576,488 | A | | 3/1986 | Steiner et al. | |
| 4,671,676 | A | | 6/1987 | Chen et al. | |
| 5,044,809 | A | * | 9/1991 | Galanty et al. | 403/24 |
| 5,211,261 | A | * | 5/1993 | Garberg | 184/5.1 |
| 5,823,295 | A | | 10/1998 | Griffith et al. | |
| 6,042,271 | A | | 3/2000 | Harris et al. | |
| 6,086,255 | A | | 7/2000 | Lyon | |
| 6,176,348 | B1 | | 1/2001 | Grebe et al. | |
| 6,176,621 | B1 | * | 1/2001 | Naitoh et al. | 384/291 |
| 6,582,661 | B1 | | 6/2003 | Pardue et al. | |
| 6,739,786 | B2 | * | 5/2004 | Reniau | 403/39 |
| 7,234,870 | B2 | * | 6/2007 | Kitahara et al. | 384/288 |
| 7,293,939 | B2 | * | 11/2007 | Abbott et al. | 405/196 |
| 7,527,450 | B2 | * | 5/2009 | Russell | 403/39 |
| 7,572,060 | B2 | * | 8/2009 | Kuroda et al. | 384/276 |
| 2005/0175414 | A1 | * | 8/2005 | Abbott et al. | 405/197 |
| 2007/0177947 | A1 | * | 8/2007 | Pollack et al. | 405/224.4 |

* cited by examiner

*Primary Examiner*—Bradley T King
*Assistant Examiner*—Thomas Irvin
(74) *Attorney, Agent, or Firm*—Elizabeth R. Hall; Elizabeth R. Hall & Associates

(57) ABSTRACT

The present invention is a lubrication system for movable pins connecting pivotable structural members of a deepwater floating oilfield production platform. The lubrication provides adequate lubrication for easing movement of the pins and also for maintaining the long-term functionality of the pins by reducing the corrosion of the pin assemblies. The lubrication of each of the pins is provided by a closed loop circulation system that provides sufficient flow and pressure to establish hydrostatic bearings around the bearing surfaces of the pin-connected members that are being axially assembled and between pin-connected members that are being rotated relative to each other. The lubrication system provides for continuously lubricating a static pinned connection for the purpose of preventing water intrusion and subsequent corrosion. Furthermore, the lubrication system provides a means for ensuring the lubrication of the most highly loaded zones of a laterally loaded pin connection.

19 Claims, 16 Drawing Sheets

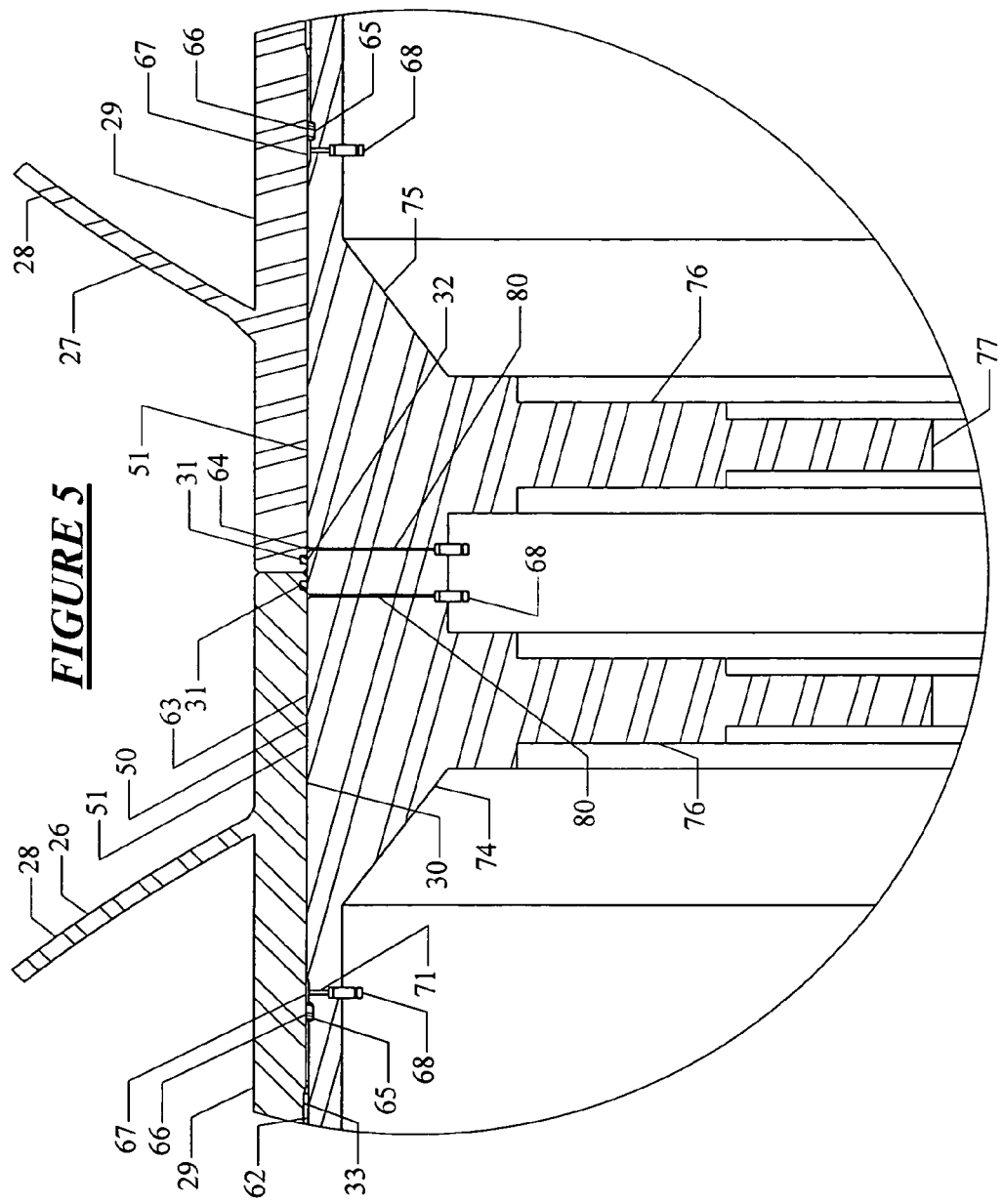

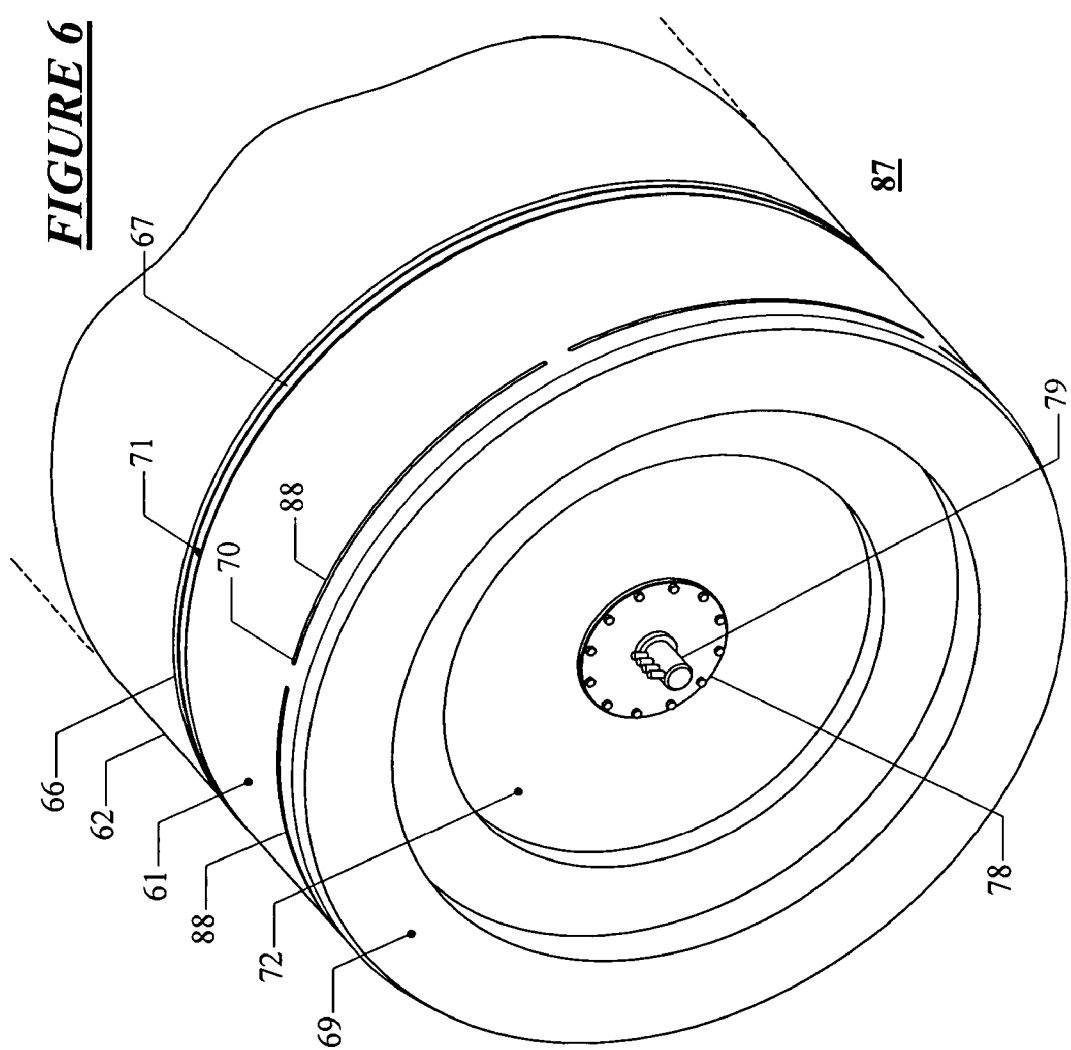

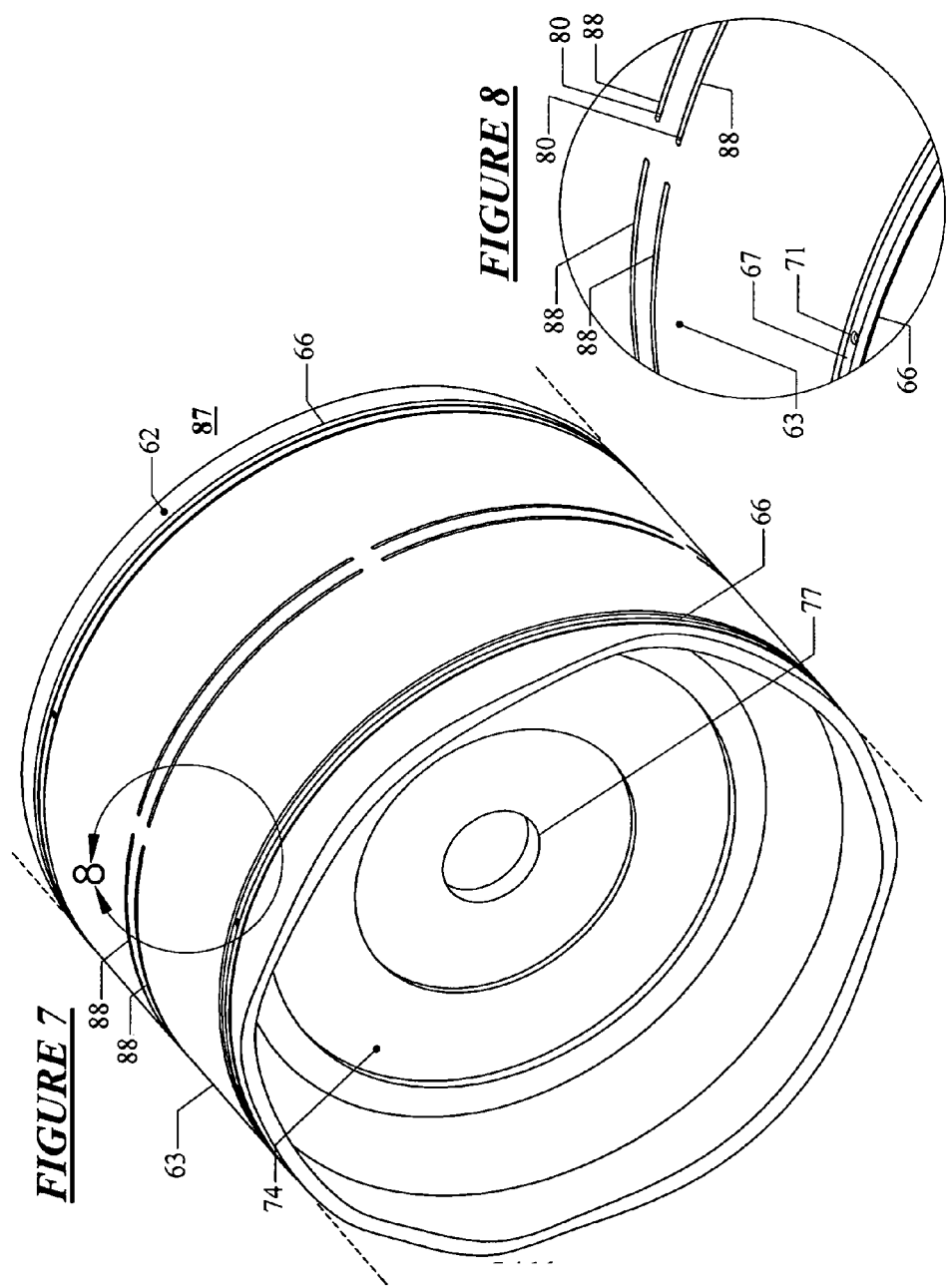

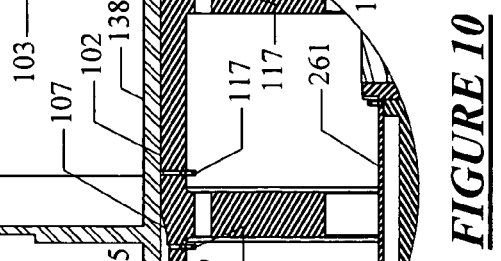
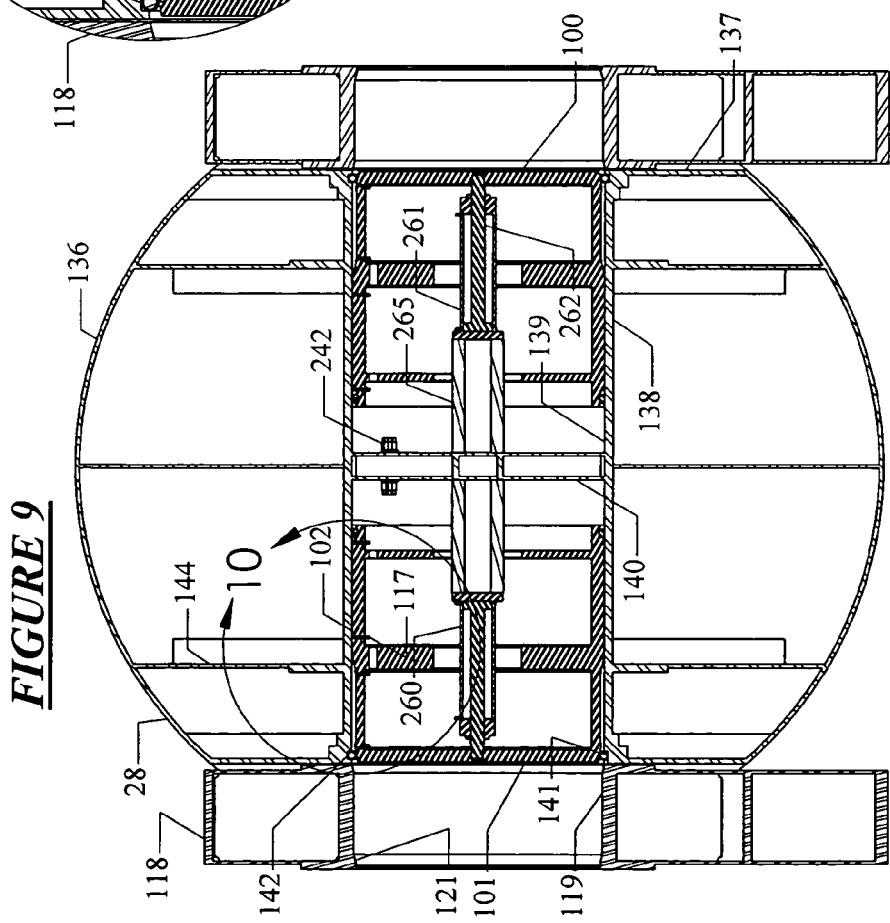

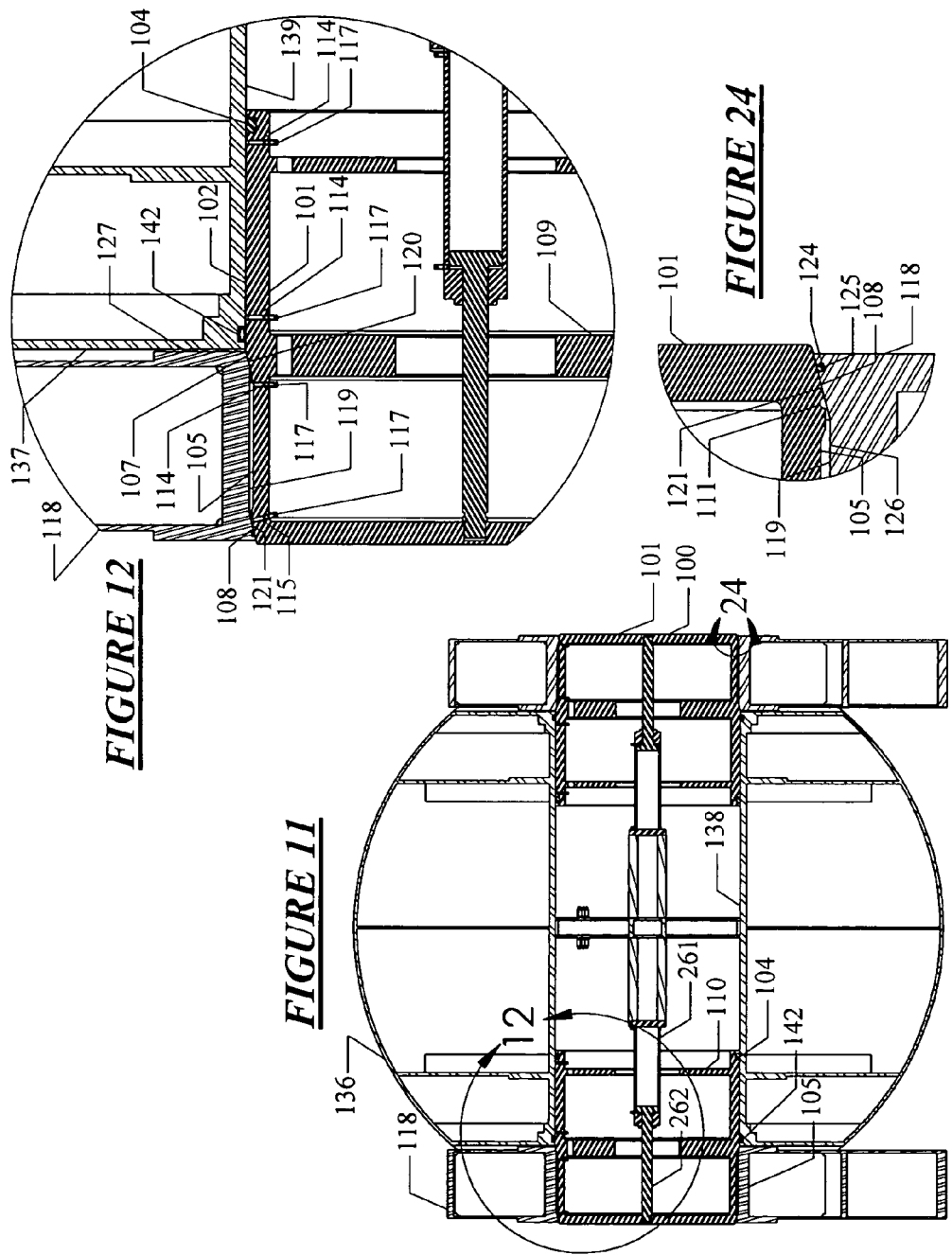

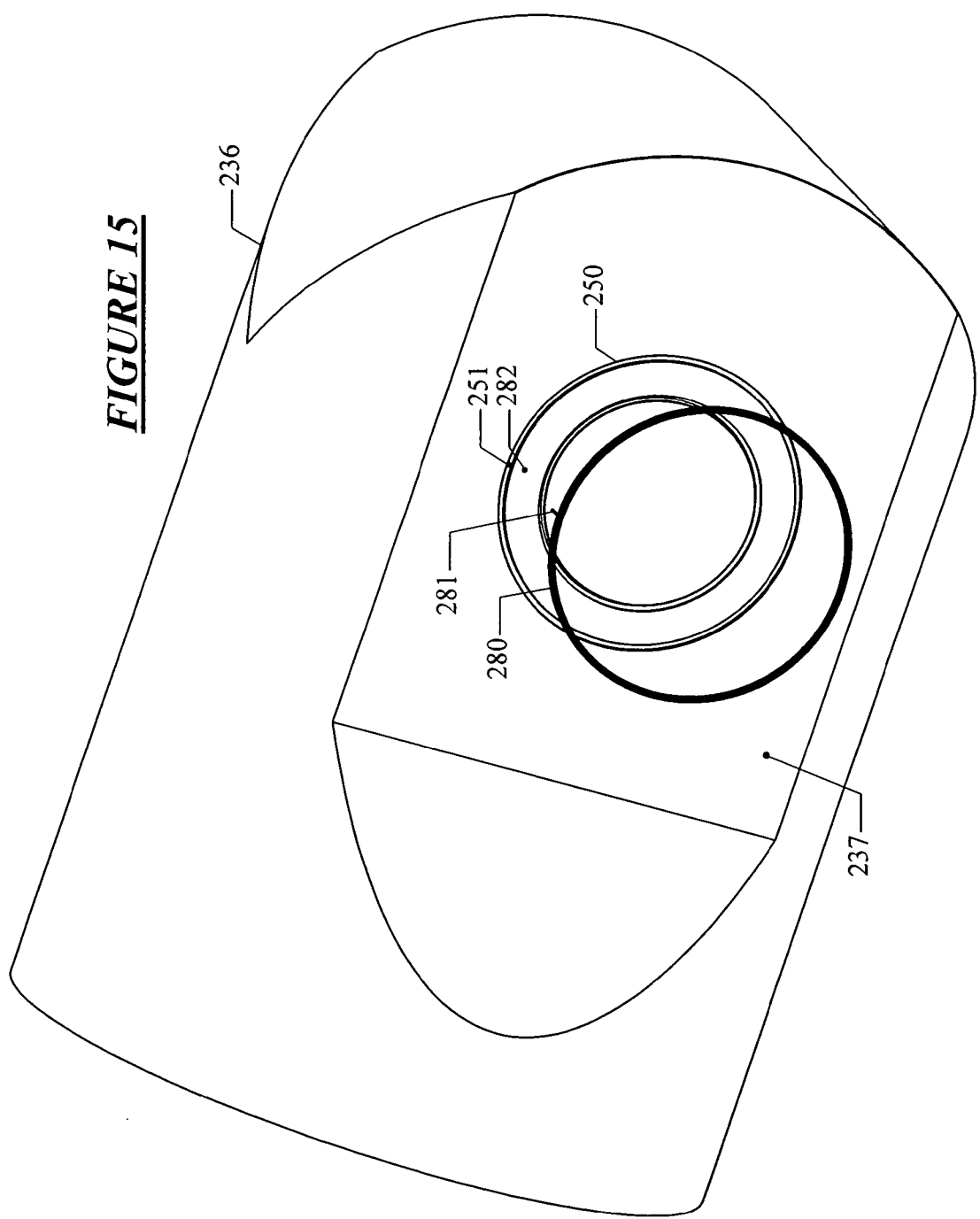

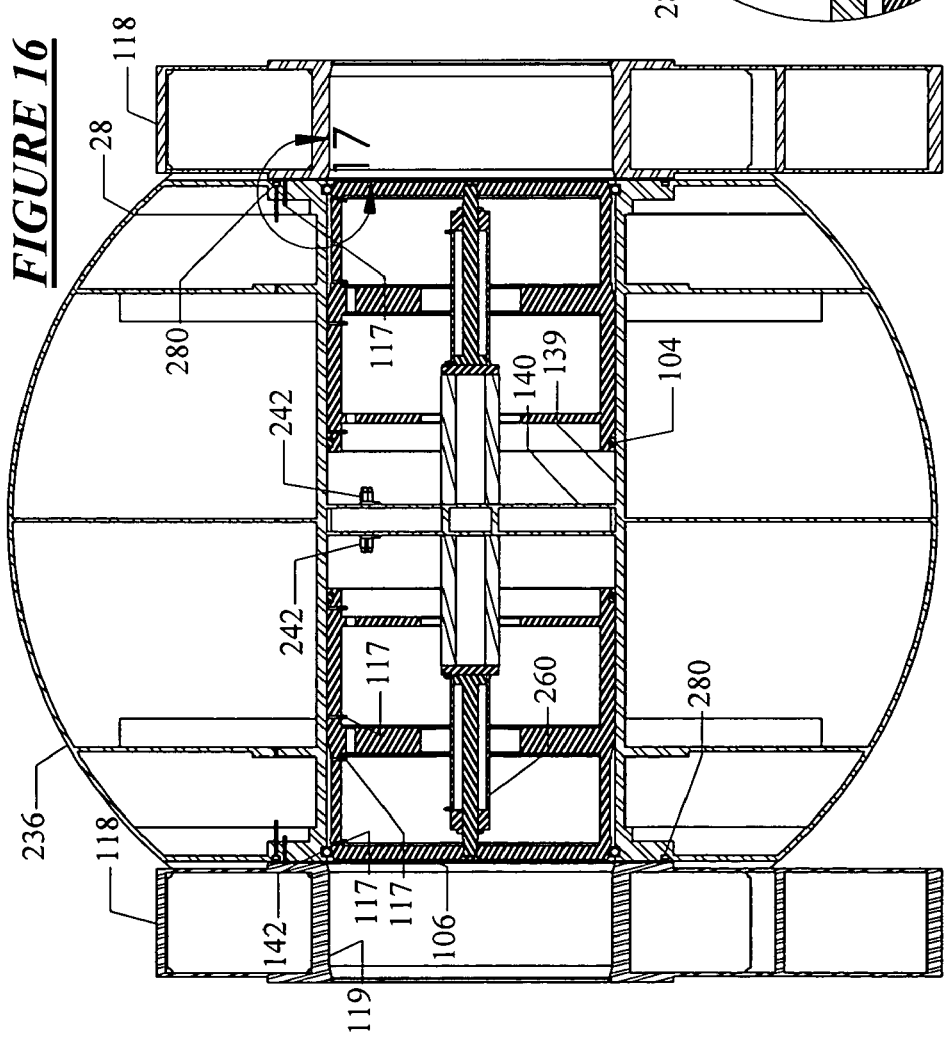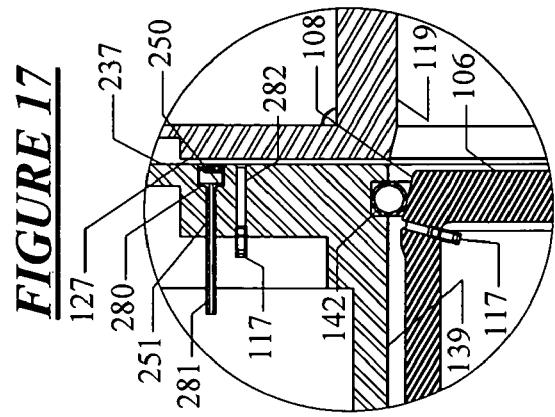

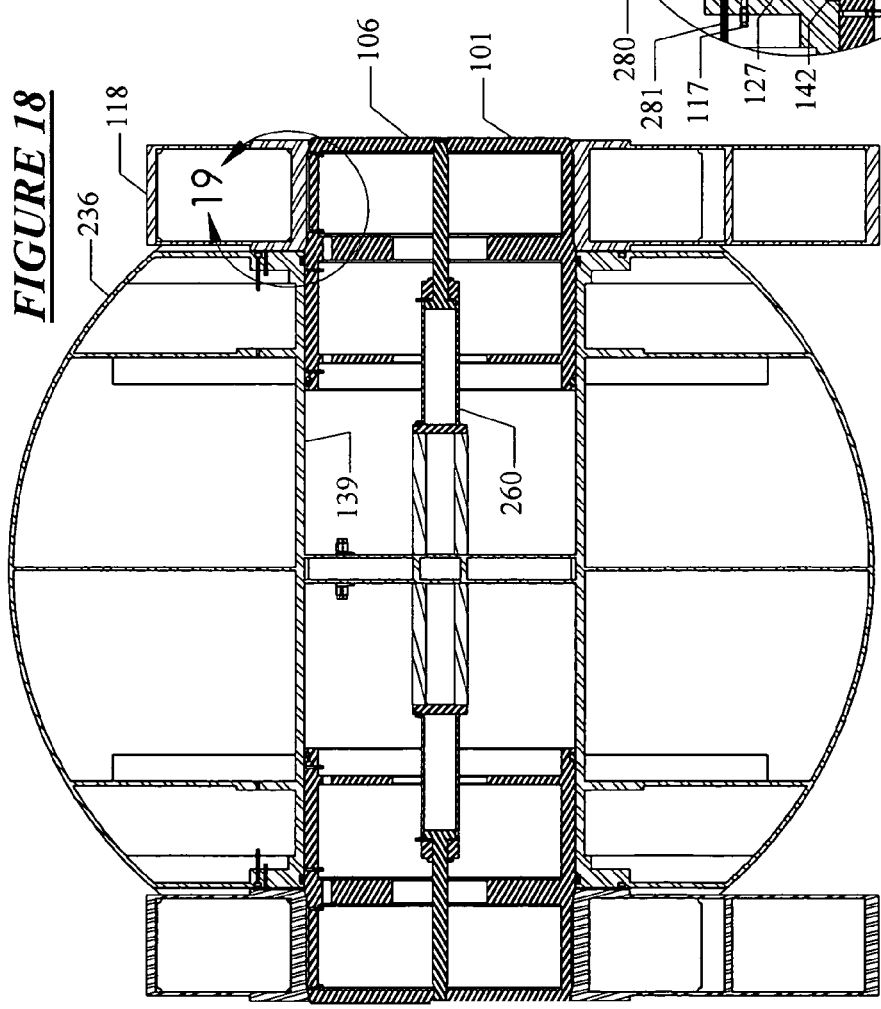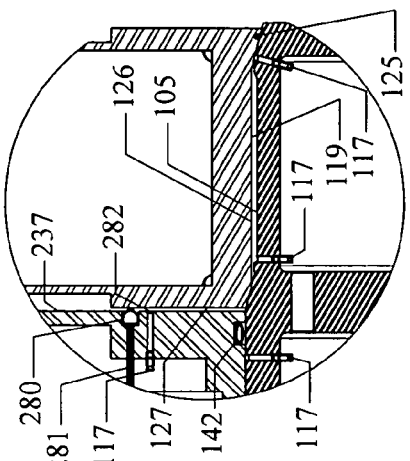

LUBRICATION SYSTEM FOR PIN CONNECTIONS

CROSS REFERENCE TO RELATED APPLICATIONS

The present application, is a continuation-in-part U.S. patent application Ser. No. 11/344,727, filed Feb. 1, 2006 entitled "Selectably Operable Field Mateable Pin Assembly" and this application claims the benefit of the earlier filing dates of provisional application Ser. No. 60/660,404 filed Mar. 10, 2005 entitled "Selectably Operable Field Mateable Pin Assembly" and provisional application Ser. No. 60/659,702, filed Mar. 8, 2005 entitled "Lubrication System for Pin Connections of an Inclined Leg Floating Production Platform with a Damper Plate."

BACKGROUND OF THE INVENTION

1. Field of the Invention

The present invention relates in general to a method and apparatus for the lubrication of movable pin connections. More particularly, the invention relates to a method and apparatus for the lubrication of pivotable pins used to interconnect the structural elements of floating marine structures.

2. Description of the Related Art

Provision of suitable deepwater floating production platforms for the offshore oil industry is necessary in order to permit economical development of petroleum reserves in the increasingly deep waters in which fields are being located. Economic constraints require that the production platform of efficient design be installed complete on location for costs that are sufficiently low so that maximum profit can be realized. The current designs have their structural assembly substantially completed while in a shipyard, with rigid welded connections being used for interconnecting their primary structural elements. The large size of these current designs requires high lifts by cranes during construction and deep draft channels for towout. Additionally, several of the current designs also require use of a large derrick barge to finish construction offshore. These constraints have very strong negative economic consequences. While adequate in most respects, the current designs are sufficiently expensive that many fields cannot be developed with a sufficiently large positive cash flow to justify the investment risk.

An improved floating platform which has its main structural elements interconnected by movable pin connections is described in copending U.S. patent application Ser. No. 1/344,727 entitled "Selectably Operable Field Mateable Pin Assembly," filed Feb. 1, 2006, and copending U.S. patent application Ser. No. 11/051,691 entitled "Inclined Leg Floating Production Platform with a Damper Plate", filed Feb. 4, 2005. This new type of platform does not require high lifts during construction, deep channels for towout, or the use of a large derrick barge for completion of construction offshore. The relatively inexpensive construction and field installation of floating platforms based on the apparatus and methods disclosed in these patent applications are enabled by the use of the movable pin connections described therein.

Pin connections in marine structures have been utilized before for structures such as jackup rigs and for the coupling together of barge-like structures. Additionally, pins have been used in buoyant towers that have large pins at their bases to permit swiveling under environmental and mooring loads. Typically, the pin connections in current use are smaller than the pin connections needed for the floating platform. In addition, pins used in marine structures have generally been located above the sea surface where they can be serviced.

The large size and high transverse loadings of the pins needed for the floating platform necessitate reducing the friction associated with either or both rotational and axial pin movement. Movable pin connections, such as designed for the floating platform having very high loads, require a means of permanent lubrication if the pins are to be maintained in an operating condition over a sustained period. This is particularly the case for the pin connections of the cited copending patent applications, since those connections are immobile for extended periods of up to several years. Additionally for any marine pin connections, corrosion is a serious potential problem, particularly in crevices and gaps between operating components.

A need exists for a lubrication system for marine pin connections that provides lubrication for easing the axial insertion into and retraction from receiving sockets of selectably extendable and retractable pins.

A need also exists for a lubrication system for marine pin connections that provides lubrication for easing rotation of the pins or about the pins.

A further need exists for a lubrication system that will permit isolating marine pin connections from the corrosive contact of seawater.

An additional need exists for a lubrication system that permits the injection of lubricant into a marine pin connection so that galling and fretting of the faying surfaces of the pin connection will be prevented.

SUMMARY OF THE INVENTION

The invention contemplates a simple, inexpensive means for solving the problems and disadvantages of the prior approaches to marine structural pins that are outlined in the discussion above. The present invention consists of a lubrication system for both the permanent pin connections and the field mateable extendable pin connections of an improved, novel type of floating production structure that offers numerous advantages over current options.

The present invention is a lubrication system for movable pins connecting structural members of a deepwater floating oilfield production platform. The lubrication provides adequate lubrication for easing movement of the pins and also for maintaining the long-term functionality of the pins by reducing the corrosion of the pin assemblies. The lubrication system creates a hydrostatic bearing between pin-connected members that are being axially assembled and between pin-connected members that are being rotated relative to each other. The lubrication system provides for continuously lubricating a static pinned connection for the purpose of preventing water intrusion and subsequent corrosion. Furthermore, the lubrication system provides a means for ensuring the lubrication of the most highly loaded zones of a laterally loaded pin connection.

The permanent pin connections and the field mateable pin connections both provide the essential mechanisms that allow the transporting of a floating platform in a partially assembled condition and then completing erection of the platform at or near its ultimate destination. Lubrication for enhancing the operation of extendable pin insertion and withdrawal for the platform is essential, since at some point the platform must be disassembled offshore for either salvage or to move to a new location. Lubrication is also essential for permitting free relative rotation about the axes of the pins. Additionally, the lubrication system provides a primary means of preventing corrosion on the faying surfaces of the pins and their sockets, thereby enhancing the long-term operability of the pins in the difficult marine environment.

The present invention is a lubrication system for both the permanent pins and the field insertable extendable pin connecting members for a deepwater floating oilfield production platform with structural framing which, in one direction, constitutes a four-bar linkage having five linking pins. The partially assembled production platform is safely towable in a shallow draft condition to a deepwater location where the damper plate and legs are lowered and the production platform is pin connected using its field insertable pins into its rigid operational linkage. Adequate lubrication is essential both for easing movement of the field insertable pins and also for maintaining long-term functionality for all the pins by reducing corrosion tendencies through use of lubrication.

A first object of the invention is to provide a lubrication system for the creation of hydrostatic bearings between pin-connected members that are being axially assembled. A second object of the invention is to provide a lubrication system for the creation of hydrostatic bearings between pin-connected members that are being rotated relative to each other. A third object of the invention is to provide a lubrication system for continuously lubricating a static pinned connection for the purpose of preventing water intrusion and subsequent corrosion. A fourth object of the invention is to provide means for ensuring lubrication of the most highly loaded zones of a laterally loaded pin connection.

One aspect of the present invention is a lubrication system for pin connections in marine environments comprising: a) a cylindrical pin having an exterior journal surface; b) a pin housing having a cylindrical pin-mounting bearing bore; c) a bearing annulus formed between the pin and the pin-mounting bore, wherein the bearing annulus is sealed at a first and a second end; and d) a closed loop lubricant circulation system in fluid communication continuously circulating lubricant to the bearing annulus.

A second aspect of the present invention is a lubrication system for a pin connection comprising: a) a cylindrical pin having an exterior journal surface; b) a pin housing having a cylindrical pin-mounting bearing bore; c) a bearing annulus between the exterior journaled surface of the pin and the pin-mounting bearing bore, wherein the bearing annulus is sealed at a first and a second end; and d) a closed lubricant circulation system having a lubricant reservoir, a lubricant pump, a lubricant delivery line, a lubricant distribution groove, an annular lubricant collector groove, and a lubricant return line, wherein the lubricant pump induces pressurized lubricant into the lubricant distribution groove, through the bearing annulus, and out the collector groove.

A third aspect of the present invention is a lubrication system for a pin connection comprising: a) a cylindrical pin having an exterior journal surface; b) a pin housing having a cylindrical pin-mounting bearing bore; c) a bearing annulus between the exterior journaled surface of the pin and the pin-mounting bearing bore; and d) a lubricant circulation system having a lubricant reservoir, a lubricant pump, a lubricant delivery line, a lubricant distribution groove, an annular lubricant collector groove, and a lubricant return line, wherein the lubricant pumps induces pressurized lubricant into the lubricant distribution groove and through the bearing annulus.

Another aspect of the present invention is a lubricated system for joining two structural elements including: a) a first structural element having a first pin housing with a cylindrical first pin-mounting bearing bore; b) a second structural element having a second pin housing with a cylindrical second pin-mounting bearing bore; c) a pin assembly for joining the first and second structural elements, the pin assembly comprising: a first cylindrical pin mounted in the first bearing bore, the first pin having a first exterior journal surface, and a second cylindrical pin mounted in the second bearing bore, the second pin having a second exterior journal surface; and c) a first bearing annulus formed between the first pin and the first pin-mounting bore, wherein the first bearing annulus is sealed with a first proximal seal and a first distal seal; d) a second bearing annulus formed between the second pin and the second pin-mounting bore, wherein the second bearing annulus is sealed with a second proximal seal and a second distal seal; e) a closed lubricant circulation system continuously circulating lubricant into the sealed first and second bearing annuli.

Yet another aspect of the present invention is a method of lubricating a pin connection comprising the steps of: (a) providing a lubrication system for a pin connection comprising a cylindrical pin having an exterior journal surface, a pin housing having a cylindrical pin-mounting bearing bore, a bearing annulus between the exterior journaled surface of the pin and the pin-mounting bearing bore, and a lubricant circulation system having a lubricant reservoir, a lubricant pump, a lubricant delivery line, a lubricant distribution groove into the bearing annulus, an annular lubricant collector groove in the bearing annulus, and a lubricant return line, wherein the lubricant pump induces pressurized lubricant into the lubricant distribution groove, through the bearing annulus, and out the collector groove; (b) continuously pumping lubricant from the lubricant reservoir into the lubricant delivery groove and the lubricant distribution groove; (c) filling the bearing annulus with lubricant to create a hydrostatic bearing in the bearing annulus; (d) removing the lubricant from the bearing annulus through the annular lubricant collector groove; and (e) returning the lubricant to the lubricant reservoir.

Still another aspect of the present invention is a method of lubricating a pin connection comprising the steps of: (a) providing a lubrication system for a pin connection comprising a cylindrical pin having a plurality of exterior journaled surfaces, a pin housing having a plurality of cylindrical pin-mounting bearing bores, a plurality of bearing annuli between the exterior journaled surfaces of the pin and the pin-mounting bearing bores, and a lubricant circulation system having a lubricant reservoir, a lubricant pump, a lubricant delivery line, a lubricant distribution groove at a first end of each bearing annulus, an annular lubricant collector groove at a second end of each bearing annulus, and a lubricant return line, wherein the lubricant pump induces pressurized lubricant into each lubricant distribution groove, through each bearing annulus, and out each collector groove; (b) continuously pumping lubricant from the lubricant reservoir into the lubricant distribution groove of each bearing annulus; (c) filling each bearing annulus with lubricant to create a hydrostatic bearing in the bearing annulus; (d) removing the lubricant from each bearing annulus through the annular lubricant collector groove; and (e) returning the lubricant to the lubricant reservoir. This method optionally includes providing an independently driven lubricant pump for each lubricant distribution groove, each lubricant pump having an output supply line; providing an interconnecting flowline to provide fluid communication between the output supply line of each lubricant pump and the lubricant distribution grooves of the bearing annuli; and providing a selectably operable on/off valve to control fluid communication between the each output supply line and the interconnecting flowline.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is an enlarged detail view of the center portion of the installed main pin of FIG. 3, taken within the circle 5 of that Figure.

FIG. 6 is an oblique view of a distal end of a second embodiment of the main pin.

FIG. 7 is an oblique view of the central portion of the second embodiment of the main pin.

FIG. 8 is an enlarged detail view of the central portion of the second embodiment of the main pin taken within the circle 8 of FIG. 7.

FIG. 9 is a transverse cross-sectional view of a first embodiment of a leg end containing a pair of the first embodiment of opposed selectably extendable pins, wherein the leg end is emplaced between an opposed pair of pin sockets preparatorily to pin engagement in those sockets.

FIG. 10 is an enlarged detail view of a portion of the leg end and an adjacent pin socket of FIG. 9 taken within the circle 10 of that Figure.

FIG. 11 corresponds to FIG. 9, but shows the extendable pins fully engaged in the opposed pin sockets.

FIG. 12 is an enlarged detail view of a portion of the leg end and an adjacent pin socket of FIG. 11 taken within the circle 12 of that Figure.

FIG. 15 is an oblique partially exploded view of a second embodiment of a leg end, wherein the leg end is provided with a selectably operable inflatable face seal on each side for the purpose of sealing against an adjacent pin socket.

FIG. 16 is a transverse cross-sectional view of the second embodiment of the leg end taken along the longitudinal axis of the pins, wherein the leg end is positioned between its pin sockets, but with the pins retracted.

FIG. 17 is an enlarged detail view of a portion of the leg end and adjacent pin socket taken within the circle 17 of FIG. 16.

FIG. 18 is a transverse cross-sectional view of the second embodiment of the leg end corresponding to FIG. 16, but with the pins extended and the selectably operable inflatable face seals extended to seal against the pin sockets.

FIG. 19 is an enlarged detail view of a portion of the leg end and adjacent pin socket taken within the circle 19 of FIG. 18.

FIG. 24 is an enlarged detail view of the outer tip of an engaged first embodiment of the selectably extendable pin taken in the circle 24 of FIG. 11.

DESCRIPTION OF THE PREFERRED EMBODIMENTS

Figure 1:
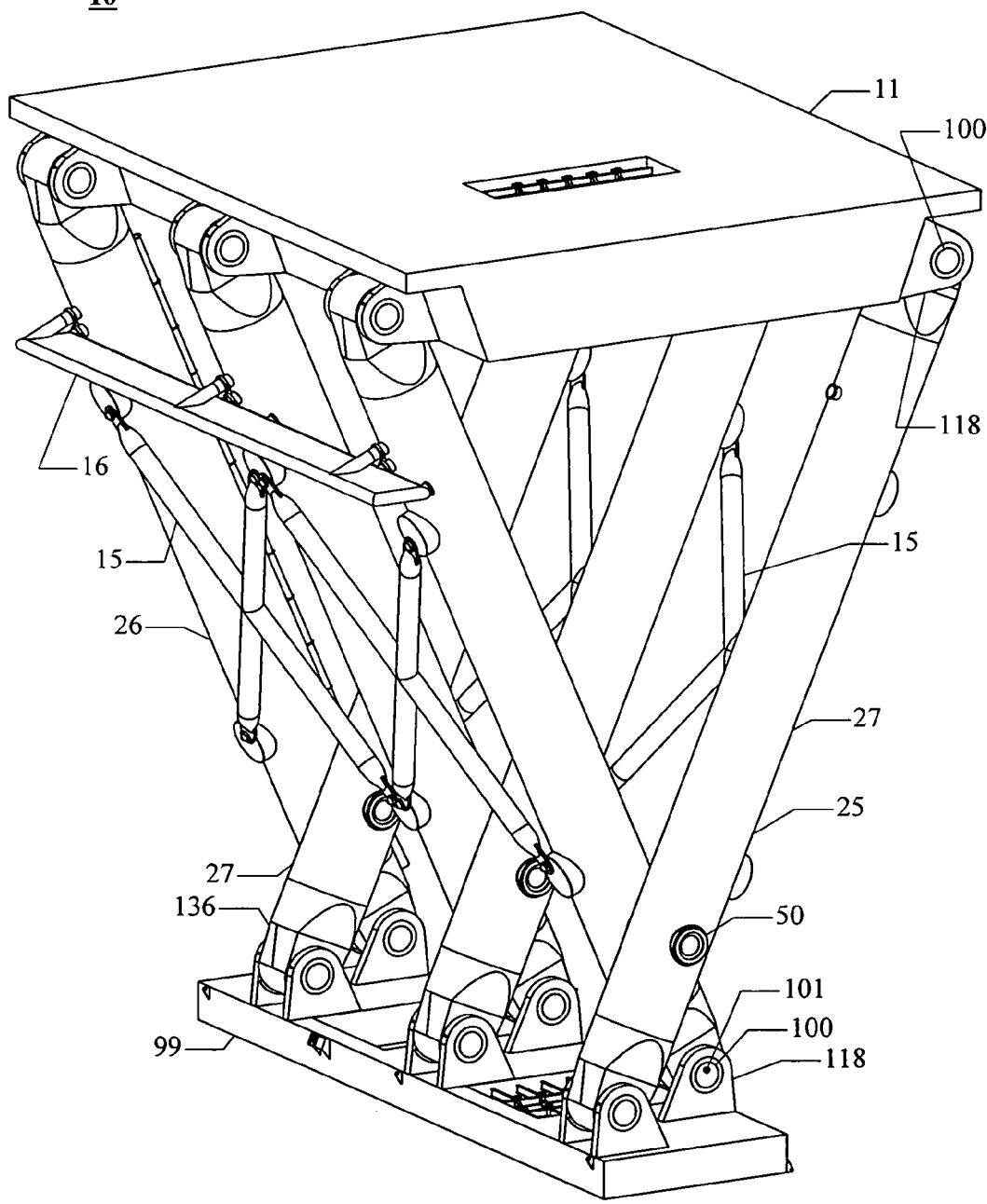
FIG. 1 is an oblique view of an inclined leg floating marine platform constructed with and assembled by the lubricated pin connections of the present invention.

The present invention relates to the lubrication of permanently mounted and selectably operable extendable pins used to interconnect and pivot structural members used in the assembly and disassembly of large structures, such as a floating offshore platform for deepwater marine applications. As defined in Machinery's Handbook, 20th Edit., Industrial Press Inc., New York, N.Y., pp. 559-572, the pin connections of the present invention are journal bearings, wherein the pins are the journals and their housings and sockets serve as plain bearings. These pin connections are subject to rotation, axial reciprocation, or both. The lubrication is used both to ease motion of the pins and to protect the pins from corrosion over long periods of submergence and nonoperation. The lubrication of each of the pins is provided by a closed loop circulation system that can provide sufficient flow and pressure to establish hydrostatic bearings around the bearing surfaces of the pins when the pins are to be moved either axially or rotationally. The provision of hydrostatic bearings is desirable in order to reduce both friction and wear.

The construction and installation of structures utilizing the lubricated pin connections of the present invention will typically use multiple pairs of legs joined by permanent main pins and multiple sets of selectably operable extendable pins mounted in the ends of the legs to connect, support, and stabilize the major structural components of the structure. For example, the pins are useful in the assembly and disassembly of a new type of floating moored oilfield offshore platform for deepwater applications. This new platform type is described in a copending U.S. patent application Ser. No. 11/051,691 entitled "Inclined Leg Floating Production Platform with a Damper Plate", filed Feb. 4, 2005. The selectably operable extendable pins used for this new platform type are described in a copending U.S. patent application Ser. No. 11/344,727 entitled "Selectably Operable Field Mateable Pin Assembly", filed Feb. 1, 2006, that is hereby incorporated by reference.

Typically the components of the main structural elements of the floating platform and the pin connections are steel. The platform design uses tubular members, stiffened shells, and stiffened plate structures, as is common in shipyard and offshore construction. Welding is the primary means of assembly for the structure. Components requiring closer tolerances, such as pins, pin housings, and sockets, are machined. Relatively close tolerances must be held on the locations of the pin connections and their mating members in order to ensure easy assembly and long-lived operation. The selectably operable extendable pins may be cast in one piece in ductile iron or austempered ductile iron. Alternatively, both the permanent main pins and the selectably operable extendable pins may be made from some combination of steel forged disks and rings, castings, and rolled plate. Careful measurements are used during fabrication so that the mating members will have necessary operating clearances and can be comated readily. The material for the seals shown herein is an appropriate water and oil resistant elastomer, such as nitrile (NBR) rubber or Viton™.

General Description of the Platform and its Assembly

Referring to FIG. 1, a floating offshore platform 10 assembled using the lubricated pin connections of the present invention is shown. The primary structural elements of the platform 10 are a bargelike deck section 11, multiple buoyant leg pairs 25, and a bargelike rectangular prismatic damper plate 99. The leg pairs 25 are crossed and the leg pairs are located in parallel offset vertical planes when installed.

The primary structural components are interconnected by selectably operable extendable pins 101 in the extendable pin assemblies 100 which are mounted in the leg ends 136 of the leg pairs 25. The extendable pin assemblies 100 can be caused to engage with pin sockets 118 mounted in opposed pairs on both the deck 11 and damper plate 99. All of the opposed pairs of pin sockets 118 on a side of the deck 11 or of the damper plate 99 are coaxial, and there is a pair of sockets for each leg end 136.

Each pair of the multiple leg pairs 25 consists of a first leg 26 and a second leg 27. For each leg pair 25, the legs 26 and 27 are substantially similar and are rotatably connected in parallel but offset planes by a main pin assembly 50 positioned intermediate to their lengths. Each right circular cylindrical tubular leg 26 or 27 has a coaxially mounted leg end 136 at each of its distal ends.

The multiple leg pairs provide the buoyancy for the floating inclined leg production platform 10, with the waterline for the structure below the deck approximately 20% of the distance between the deck 11 and the damper plate 99. The boat landing 16 is a tubular structure supporting a flat surface which is horizontal and slightly above the water surface for the platform 10 when it is installed.

The primary structural components 11, 25, and 99 of the platform structure 10 are partially assembled in sheltered waters prior to being towed offshore. Once offshore at the desired location, the platform is reconfigured from a partially pinned planar towing condition floating on the surface of the water to a fully pinned condition as shown in FIG. 1. The towout configuration of the platform permits the preassembled structure to float with a very shallow draft, which consequentially permits assembly and towout of the platform 10 from shallow ports.

Figure 2:
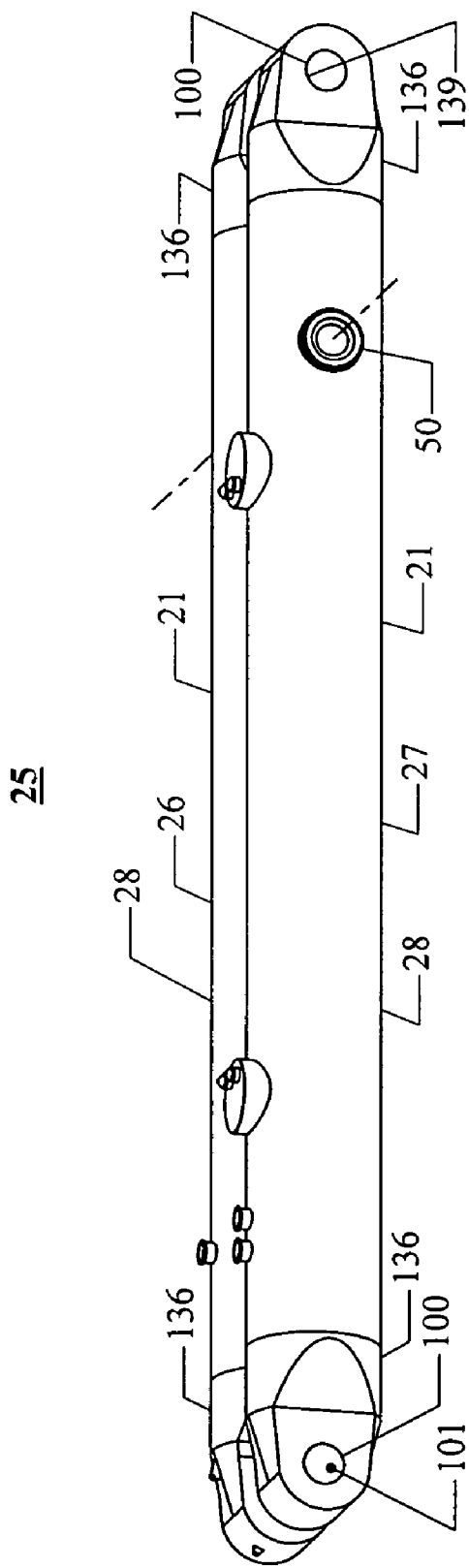
FIG. 2 is an oblique view of an assembled pair of legs of the inclined leg floating marine platform in which the lubricated pin connections of the present invention are utilized.

Referring to FIG. 2, a leg pair 25 is shown in the orientation used for making the initial preassembly of the platform 10. For this preassembly, the individual first legs 26 and second legs 27 in the leg pair are placed in parallel and offset from each other. The central portion 21 of each of the legs 26 and 27 of a leg pair is composed of a right circular cylindrical tube 28 which is internally compartmentalized and reinforced with ring stiffeners. At both its upper and lower ends, each leg 26 and 27 has a leg end assembly 136 in which a pair of opposed, outwardly looking selectably extendable pins 101 are installed coaxially in mirror-image cylindrical outwardly opening bores 139 in the leg end. The legs also are provided with mountings for a boatlanding 16, as well as bosses with mounting pins for the attachment of diagonals 15 which are used to interconnect the individual adjacent leg pairs 25. The legs 26 and 27 in a leg pair 25 are positioned antisymmetrically and are cojoined by a main pin assembly 50. The longitudinal axis of the main pin assembly 50 intersects the longitudinal axes of the parallel legs 26 and 27 perpendicularly at a position intermediate to the length of the legs.

The preassembled towout configuration of platform 10 has the deck section 11 floating on the water surface as do each of the leg pairs 25. At this time, each of the cojoined legs 26 and 27 of each leg pair 25 are mutually parallel as shown for a single leg pair in FIG. 2. The X-braces 15, shown in FIG. 1 with a first set interconnecting the adjacent first legs 26 and a second set interconnecting the adjacent second legs 27, are in place for the towout configuration. In addition, the upper ends 136 of the first legs 26 are connected to the sockets 118 on a first side of the deck 11 by means of the extendable pin assemblies 100 in the leg ends, while the lower ends 136 of the first legs also are connected to the damper plate 99 by their pin assemblies 100. The weight of the damper plate 99 is small enough to be supported by the buoyancy of the lower ends of the legs. Also, the second legs 27 are joined to the first legs 26 by means of a main pin assembly 50 for each leg pair 25.

The towout configuration of the platform 10 permits pivoting about the cylindrical longitudinal axis of the pinned connections of the extendable pin assemblies 100 in the leg ends 136 of the first legs 26 and the engaged sockets 118 of the first side of the deck 11. Thus, the final assembly procedure for the platform 10 is conducted offshore in water that is a minimum of 20% deeper than the length of the legs. For this final assembly, the second legs 27 are rotated about their main pin assemblies 50 by using buoyancy adjustments so that their upper ends are submerged while their lower ends are lifted above the water surface.

The rotation of the second legs 27 permits the extendable pin assemblies 100 at the lower ends of those legs to be engaged with the pin sockets 118 on the side of the damper plate 99 opposed to the side where the first legs 26 are already connected. Locating stops (not shown) on the inner faces of the pin sockets 118 abut the lower leg ends 136 to aid in aligning the extendable pin assemblies 100 with the bores in the pin sockets. For this process, both the deck 11 and the first legs 26 remain floating on the water surface. Following this joining of the lower end of the second legs 27 to the damper plate 99, the damper plate and the leg pairs 25 constitute a rigid assembly that is movable about the pin connection of the first legs 26 to the deck 11.

The legs 26 and 27 of the leg pairs 25 at this time are crossed at their main pin assemblies 50. Controlled ballasting of this rigid body permits it to be rotated about the pins 100 connecting the first legs 26 and the deck section 11 so that the spread leg pairs 25 and the damper plate 99 are underneath the deck. Again, locating stops (not shown) on the inner faces of the pin sockets 118 on the second side of the deck 11 abut the upper leg ends 136 of the second legs 27 to aid in aligning the extendable pin assemblies 100 with the bores in the pin sockets. At this point, the extendable pins 100 at the upper end of the second legs 27 can be extended to engage in the pin sockets 118 on the second side of the deck 11, thereby fully rigidizing the structure of the platform 10. The platform legs are then deballasted so that the platform 10 is brought to its desired operating draft to complete its assembly operations. The platform at this point is in its operational condition shown in FIG. 1.

The final assembly of the platform 10 from its towout configuration to its operational condition converts the platform 10 from a linkage flexible in the plane perpendicular to the axes of its pin assemblies 50 and 100 to a rigid body. This final assembly operation depends upon the ability of the pins to provide engagement with rotational motion for the partially connected linkage. Lubrication of the pins is desirable to ease the rotations and to avoid damage on the highly loaded rotating mating surfaces.

Both the main pin assemblies 50 and the extendable pin assemblies 100 of the first legs 26 are required to provide rotation during installation. However, it should be noted that, once that the platform 10 is fully assembled, none of the pin assemblies are actively in motion except for minor elastic deformations and play due to operational clearances in the pin connections. Since the connected platform 10 is typically in place for several years at a time, the pin connections are subject to potentially severe corrosion problems. The lubrication system of the present invention controls the corrosion of the assembled pins by maintaining a constant lubrication of the pins.

For both the main pins and the selectably operable extendable pins, hydraulic lubricant supply systems are provided to feed the lubricant distribution structures integral with the pins. Initially, the structure of the pins and their lubricant distribution structures will be described.

The Main Pin Assembly First Embodiment

Figure 3:
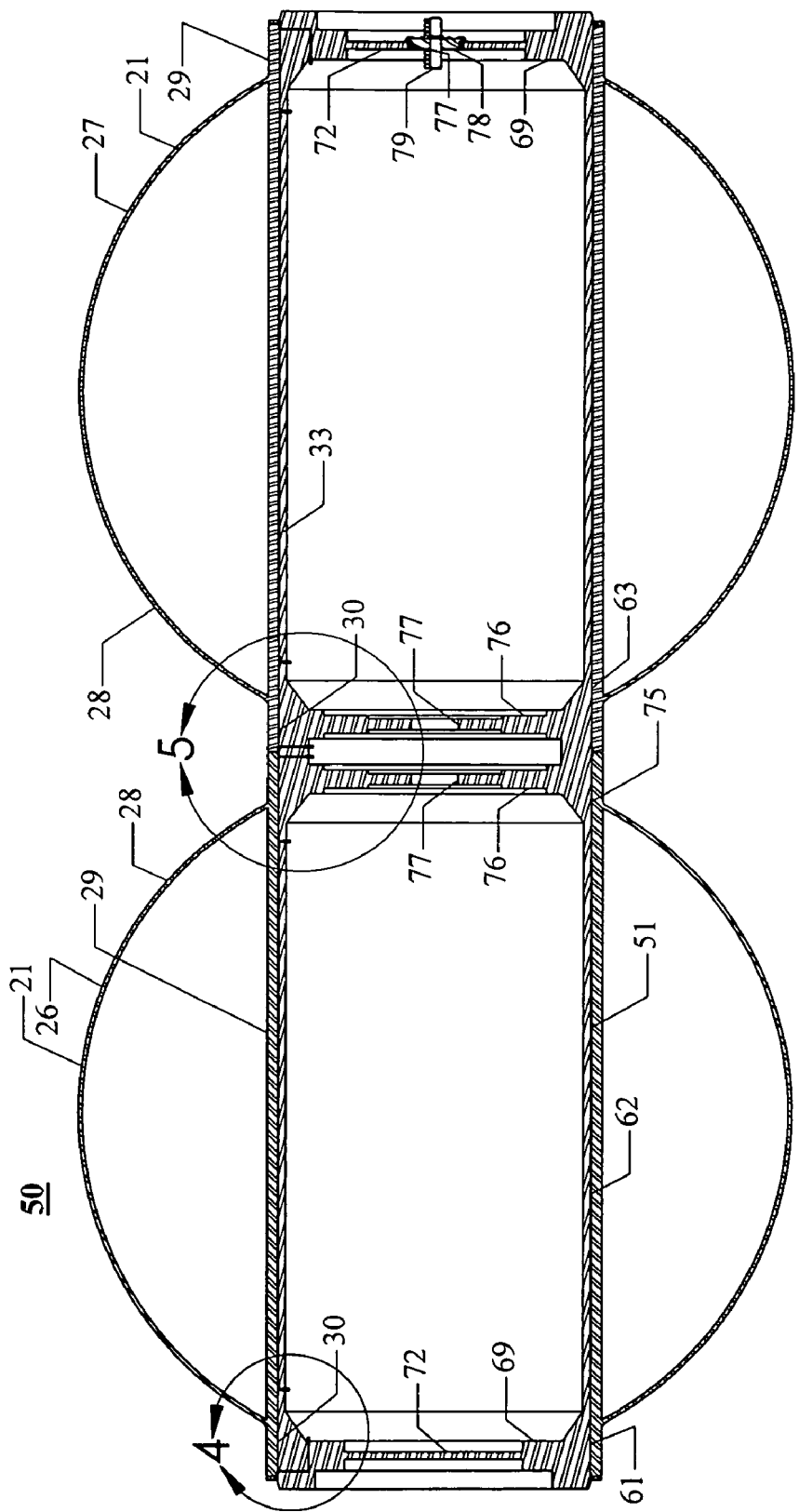
FIG. 3 is a transverse cross-sectional view of the pair of legs of FIG. 2, taken along the axis of a first embodiment of a main (permanent) pin assembly.
Figure 4:
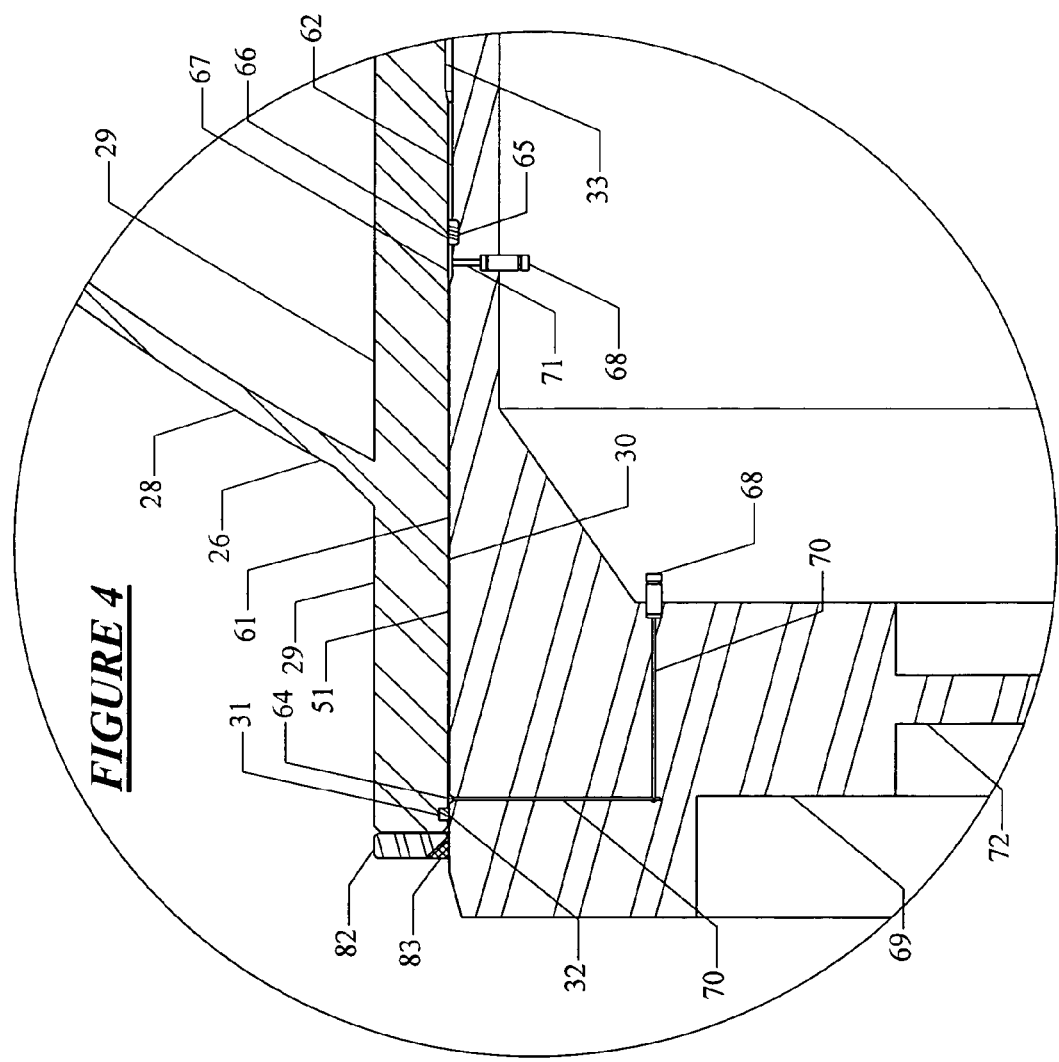
FIG. 4 is an enlarged detail view, taken within the circle 4 of FIG. 3, of the outer end of the installed main pin.

FIGS. 3, 4, and 5 show a general view and details of the mounting of the main pin assembly 50 in the leg pair 25. Referring to FIG. 3, a transverse cross-sectional view of the leg pair 25 is shown along the longitudinal axis of the main pin assembly 50. The two legs 26 and 27 are shown in a parallel condition, but are pivotable about the generally right circular cylindrical main pin 51.

The legs 26 and 27 each have an integral transverse right circular cylindrical tubular sleeve 29 perpendicularly intersecting the longitudinal axis of the leg so that it can provide a bearing sleeve for the main pin assembly 50. The diameter of the sleeve 29 is on the order of 0.35 to 0.44 the diameter of the leg in which it is mounted, and the distal ends of the sleeve project slightly beyond the outer cylindrical surface of the leg.

Sleeve 29 has a relatively heavy wall and has a short outer end straight bore 30 at both ends with a slightly enlarged central bore 33. Near the outer end of the bore 30 on each end of sleeve 29 is located an annular female seal groove 31 housing an annular female elastomeric seal 32. The sleeve 29 with its bore is symmetrical about its vertical transverse midplane. The seals 32 seal against the outer cylindrical journal surfaces 61 and 63 of the main pin assembly 50 so that the annular spaces between the main pin assembly and the bore 30 of the sleeve 29 are isolated.

The main pin assembly 50 consists of the following: a main pin 51, an annular male seal 66, multiple hydraulic quick connect fittings 68, a manhole cover 78, a hydraulic swivel 79, and a pair of keeper rings 82. The main pin 51 is a heavy walled right circular cylindrical tube with heavy transverse diaphragms located under regions where the cylindrical walls 28 of the leg central sections 21 intersect the sleeves 29 of the legs 26 and 27. As seen in FIG. 3, the main pin is symmetrical about its vertical transverse midplane except for the provision of manholes 77 in all but the lefthand outer end transverse diaphragm 69.

Starting from the lefthand end of main pin 51, the exterior of the pin has an outer end cylindrical bearing surface 61 with a first diameter, a reduced diameter outer cylindrical surface 62, a central cylindrical bearing surface 63 having the same diameter as the first diameter, another reduced diameter surface 62, and another outer end cylindrical bearing surface 61. The cylindrical bearing surfaces 61 and 63 serve as bearing journals. The lengths of the bearing surfaces 61 and 63 are relatively short, while their diameters are a close slip fit to the bores 30 of the sleeves 29 of the legs. The transitions between diameters on the outer cylindrical surface of the pin 51 are frustroconical shoulders that smoothly match their adjacent right cylindrical sections. Spaced slightly inwardly from the distal ends of main pin 50 are annular male lubricant distribution grooves 64. Likewise, an annular male lubricant distribution groove 64 is spaced slightly off the transverse midplane of the main pin 50 on each side. The lubricant distribution grooves are located between the female o-rings 32 of the sleeves 29.

Slightly inward of each distal end of the reduced diameter sections 62 is an annular male seal groove 65, each containing an annular male elastomeric seal 66 which seals against the bore 30 of the sleeve 29 of the leg 26 or 27. On the interior side of each outer bearing surface 61 of main pin 51, an outer end annular lubricant collector cavity 67 is formed between reduced diameter 62, seal 66, and bore 30. Each outer end lubricant collection cavity 67 is accessed by a radial lubricant collection port 71 in which a hydraulic quick connect fitting 68 is sealingly mounted on the interior cylindrical wall of main pin 51.

Similarly, in the middle of main pin 51 adjacent each inner end of the sleeves 29 where they abut the sleeve of the other leg in the leg pair 25 and on the outer ends of the central cylindrical bearing surface 63, an inner end lubricant collector cavity 67 is formed between seal 66, bore 30, and reduced diameter section 62. Each inner end collector cavity 67 is accessed by a radial lubricant collection port 71 in which a hydraulic quick connect fitting 68 is mounted on the pin interior end.

Each inner end annular lubricant distribution groove 64 is accessed by lubricant injection channel 80, which also sealingly mounts on its pin interior end another quick connect fitting 68. Each outer end annular lubricant distribution groove 64 is accessed by lubricant injection channel 70, which also sealingly mounts on its pin interior end another quick connect fitting 68. The lubricant injection channel 70 is formed by two perpendicular intersecting holes, with a first hole being radial and a second hole drilled on the inside transverse face of the outer end transverse diaphragm 69.

Figure 20:
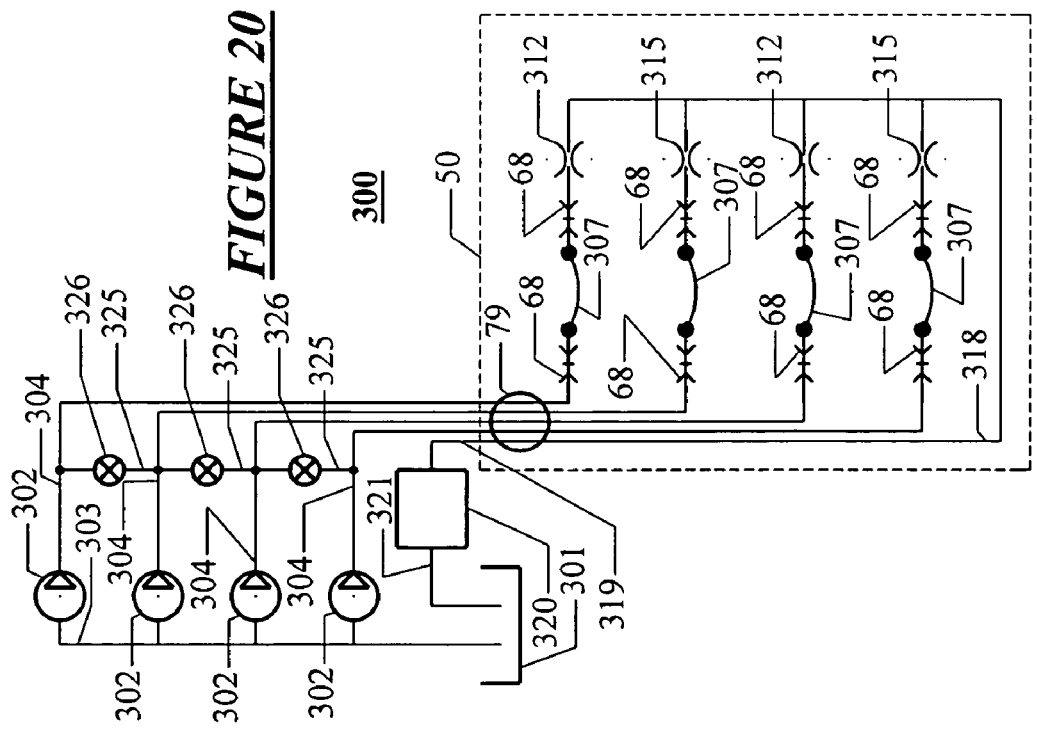
FIG. 20 is a schematic representation of the lubricant flow system for the main pin assembly of FIG. 3.

For simplicity, only one half of a hydraulic quick connection fitting pair 68 is shown in FIGS. 3, 4, and 5 without its interconnecting second half of the quick connection for each of the flow ports in the main pin 51. The flow circuit 300 for the main pin assembly 50 shown in FIG. 20 shows both halves of the quick connection fittings 68, along with interconnecting hoses or tubing, which are omitted in FIGS. 3 to 5 for clarity.

Separate journal bearings are formed between the cylindrical bearing surfaces 61 and 63 of the pin 51 and the bearing bores 30 of the sleeves 29 of the legs 26 and 27. These journal bearings are isolated by the O-rings 32 of the legs 26 and 27 and the annular seals 66 of the main pin assembly.

Outer transverse diaphragm 69 is composed of multiple built-up and integrally joined stepped rings which thicken and widen with increasing diameter, along with an integral thinner central diaphragm disk 72. The central diaphragms 74 are similarly constructed, but have a heavy wall outer ring 75 and two interior stiffening bulkheads 76 symmetrically positioned to either side of the transverse midplane of the main pin 51. The interior stiffening bulkheads also each are composed of multiple built-up and integrally joined stepped rings which thicken and widen with increasing diameter, along with an integral thinner central diaphragm disk having a circular coaxial manhole 77 cut through to permit inspection in the field.

As seen in FIG. 3, the righthand outer transverse diaphragm 69 has its manhole 77 sealed by a manhole cover 78 which is sealed with a gasket and held in place by bolts connecting it to the diaphragm 69. In the middle of manhole cover 78 on the centerline of the main pin assembly 50 is located a multichannel hydraulic fluid swivel 79 which on a first end connects by hoses or hard piping (not shown) to the quick connects 68 inside the main pin 51. The second end of the swivel connects to the external lubricant supply and the lubricant return lines (not shown). The lubricant supply system for the main pin assembly 50 is shown in FIG. 20 and is described later in this specification. The swivel permits the correct feeding of lubricant, such as heavy lubricant, to the lubricant distribution grooves 64 and the eduction of lubricant or lubricant through the lubricant collection cavities 67, even when the legs and or the pin assembly are being rotated.

As seen in FIG. 4, an annular plate keeper ring 82 is welded near each distal end of the main pin 51 to the outer cylindrical bearing surface 61 by groove weld 83 so that the interior side of the keeper ring can abut the outer transverse end of the sleeve 29 of its adjacent leg. In this manner, main pin assembly 50 is retained within the sleeves 29 of the legs 26 and 27 and the leg pair 25 is held together.

Main Pin Second Embodiment

FIG. 6 shows the outer end of an alternative main pin 87 to the main pin 51 shown in the FIGS. 3 to 5, while FIGS. 7 and 8 show the central portion of the alternative main pin. Alternative main pin 87 is used for cases when the loads on the main pin are high and the annular gaps are relatively large between the main pin and the bores 30 of the tubular sleeves 29 of the legs 26 or 27. By separating the perimeter of the main pin 87 into zones which each are independently fed similar flow volumes of lubricant, the more highly loaded and hence, more flow restrictive annular zones are still provided sufficient flow that a hydrostatic bearing is maintained in those zones. If only a single annular groove were to be used for a large gap high load situation, the lubricant inflow would have to be very high in order to ensure that the most highly loaded of the pin would remain locally supported by a hydrostatic bearing.

Alternative main pin 87 is identical to main pin 51 in all respects except that each of the 360° annular lubricant distribution grooves 64 of the first main pin embodiment 51 is replaced by a circumferentially equispaced coplanar array of separate short grooves. Each alternative annular lubricant distribution groove 88 extends for a limited arc length (e.g., 58° when six arcuate grooves 88 are used) and is provided with its own separate lubricant injection passage 70 or 80.

The arc length of the gaps between the grooves 88 in an array is much smaller than the arc length of the grooves. Thus, with the grooves 88 equispaced around the periphery of the pin, the pin 87 is provided with independent lubricant feed grooves. Additionally, each groove 88 is individually fed with its own lubricant supply by its own source line, quick connect 68, and feedhole 70 or 80. The flow from the separate arcuate grooves 88 is collected in the same annular lubricant cavities 67 and drained by a single lubricant collection port 71 for each cavity 67 as is the case for the previously described main pin assembly 50. The main pin lubricant supply system 300 is used to provide lubricant either to the main pin assembly 50 or to the second embodiment of the main pin 87. This main pin lubricant supply system 300 is described later in this specification.

Extendable Pin First Embodiment

The selectably operable extendable pin assemblies 100 are housed in the leg ends 136. Reference to FIGS. 9 to 13 will assist in the description of the first embodiment of the extendable pin assembly 100. An extendable pin assembly 100 consists of an extendable pin 101, a hydraulic cylinder 260, an annular male O-ring seal 104, and a lubricant distribution system 400 which uses hydraulic quick connect fittings 117 to convey lubricant in and out of the pins. Each first embodiment of the leg end 136 of the legs 26 and 27 of the leg pairs 25 is provided with opposed symmetrically positioned inset planar side plates 137 which are perpendicular to both the axis of the main pin assembly 50 and the pin sleeve 29 for the leg. Extending between the side plates 137 is a heavy wall right circular cylindrical pin housing tube 138. Pin housing tube 138 has its longitudinal axis intersecting the longitudinal axis of its leg 26 or 27, with the pin housing tube axis being parallel to the main pin assembly 50 for the leg.

Centrally located in the face of the side plates 137 and coaxial with the pin housing tube 138 are outwardly opening coaxial right circular cylindrical pin housing bores 139 which are separated by a transverse centerline bulkhead 140. The centerline bulkhead 140 serves as a cylinder mounting partition lying at the vertical midplane of the leg end. Set inwardly from the side plates 137 are symmetrically positioned leg end longitudinal bulkheads 144 which aid in supporting pin housing tube 138.

Adjacent the outwardly opening end of the pin housing bore 139 for each side of the leg end 136 is a coaxial annular female inflatable seal mounting groove 141. The inflatable seal 142 housed in the seal groove 141 is a hollow elastomeric tube which, when deflated, is fully recessed in the seal groove. The inflatable seal 141 is provided with a hollow stem (not shown) opening into the interior of the leg end and from there connected to a controllable pressure source (not shown) on the deck 11 of the assembled platform 10. Pressurized fluid thereby may be applied selectably to the interior of the inflatable seal 142 to cause it to expand inwardly in order to seal against objects within the pin housing bore 139 of the leg end 136. Release of the pressure applied to the inflatable seal 142 causes it to deflate in response to its internal elastic forces.

Mounted on the exposed transverse sides of the centerline bulkhead are pin lubricant manifolds 242. Each pin lubricant manifold 242 is connected on a first side through the interior of the leg end 136 of the leg to supply and return flowlines (schematically shown in the lubricant supply circuit descriptions of FIG. 21 or 22 and described later in this specification). On the second, externally exposed side of the lubricant pin manifolds 242, the flowlines are terminated by hydraulic quick connect fittings 117 for the purpose of establishing lubricant flow connections to the extendable pin assemblies 100.

On each outward transverse side of the centerline bulkhead 140, a right circular cylindrical tubular cylinder mount pedestal 265 is positioned on the axis of the pin housing bore, where it serves to mount a pin actuator hydraulic cylinder 260. The cylinder mounting to the pedestal 265 and the centerline bulkhead 140 is by bolts or studs and nuts, but is not shown herein for clarity. The pin actuator cylinder 260 is single-ended and double-acting, with a transverse mounting base on the cylinder body 261. The cylinder rod 262 has a male thread at its exposed distal end, whereby it can be threadedly attached to the pin 101 of the extendable pin assembly 100 on that side of the leg end 136.

The extendable pin 101 has an approximate right circular cylindrical tubular form with a transverse pin end bulkhead 106 at its exposed outer end and internal transverse stiffening from its annular ring middle 109 and inner end 110 diaphragms. The extendable pin 101 is a heavy walled structure. Transverse pin end bulkhead 106 has a blind drilled and tapped hole on the pin longitudinal axis on its interior side so that the threaded end of cylinder rod 262 can be threadedly engaged there.

Starting from its inner end, which remains engaged in the pin housing bore 139, the extendable pin 101 has a right circular cylindrical main body bearing surface 102 which extends approximately half of its length. Adjacent the inner end of pin 101, an annular rectangular cross-section male O-ring groove 103 interrupts bearing surface 102. Bearing surface 102 is a close slip fit to the pin housing bore 139. Bearing surface 102 and the pin housing bore 139 form a journal bearing. Male O-ring 104 is positioned in groove 103 and seals the annular gap between pin 101 and the pin housing bore 139.

At the outer end of bearing surface 102, short first frustroconical shoulder 107 outwardly tapers inwardly between the diameter of the bearing surface 102 and the right circular cylindrical pin tip cylindrical clearance region 105. At the outer end of pin tip clearance region 105 is short second frustroconical shoulder 108, which also tapers inwardly away from the inner end of pin 101. Both shoulder 107 and shoulder 108 have low taper angles on the order of 8° to 11° double-sided tapers.

Figure 13:
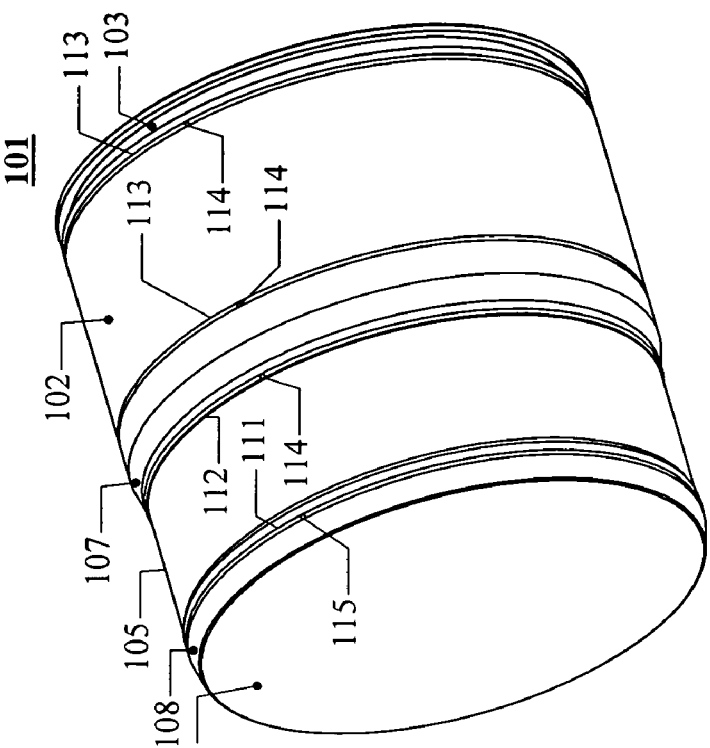
FIG. 13 is an oblique view of the first embodiment of the lubricated extendable pin of FIG. 9, wherein the pin is provided with annular lubricant injection distribution grooves.

As can best be seen in FIG. 13, bearing surface 102 is provided with identical annular male bearing surface lubricant grooves 113, with a first groove on the outward side of and near to the O-ring groove 103 and the second groove on the inward side of and near to the first frustroconical shoulder 107. A radial lubricant port hole 114 is drilled from each of the grooves 113 through the cylindrical outer wall of the pin 101. The inner ends of the lubricant port holes 114 each are counterbored and threaded for the sealing threaded engagement of a quick connect fitting 117. The first groove 113 serves as a lubricant collector groove and the second groove 113 serves as a lubricant distribution groove.

Near the outer tip of the pin 101 at the transition between the pin tip clearance region 105 and the second frustro-conical shoulder 108 is located another, third annular pin tip lubricant groove 111. This lubricant groove 111 has a through pin tip lubricant port hole 115 in a diametrical plane inclined to the axis of the pin extending through the pin end bulkhead 106 from the groove 111 to the interior of the pin. The inner end of the lubricant port hole 115 is counterbored and threaded for the sealing threaded engagement of a quick connect fitting 117.

Figure 21:
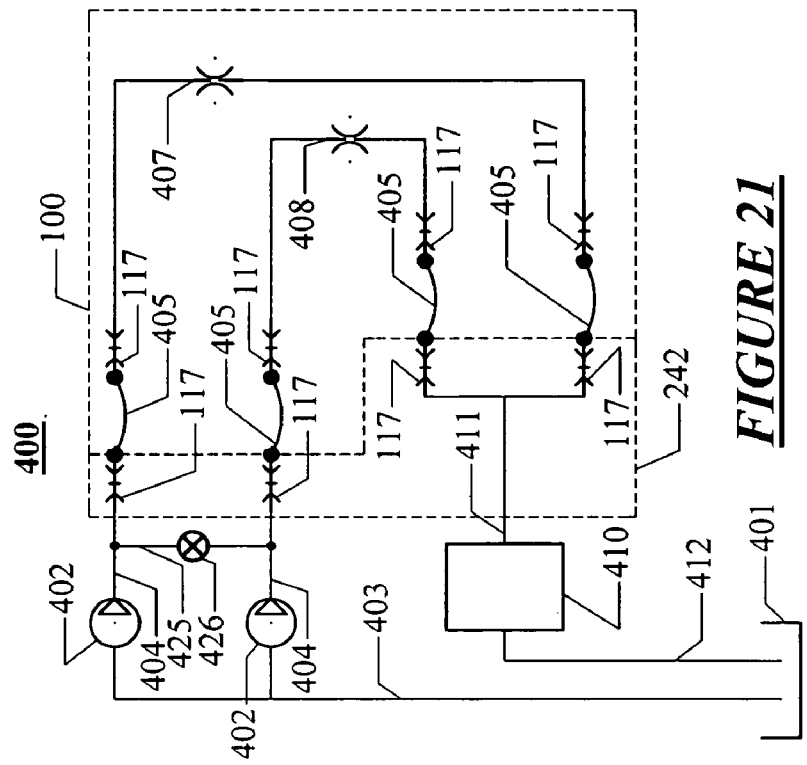
FIG. 21 is a schematic representation of the lubricant flow system for the first embodiment of the selectably extendable pins shown in FIGS. 9 to 13.

At the transition between the first frustroconical shoulder 107 and the pin tip clearance region 105 is located a fourth annular clearance region lubricant groove 112. Again, a radial lubricant port hole 114 is drilled from the groove 112 through the cylindrical outer wall of the pin 101. The inner end of this lubricant port hole 114 also is counterbored and threaded for the sealing threaded engagement of a quick connect fitting 117. The third lubricant groove 111 serves as a lubricant collector groove for the outer end of the pin 101 and the fourth lubricant groove 112 serves as a lubricant distributor groove. The lubricant supply system 400 for this combination of the first embodiment of the leg end 136 and the first embodiment of the extendable pin assembly 100 is shown in FIG. 21; a description for the lubricant supply system 400 is provided in the following description. However, the lubricant flow pattern is from the grooves on either side of the first frustroconical shoulder 107 to the grooves 111 and 113 near the ends of the pin 101.

The pin socket 118 is a hollow flat slab-like structure built primarily of flat steel plates joined together by welding. FIGS. 9 to 12 and 24 show the details of the pin socket 118. A socket bore suitable for engagement by an extendable pin assembly 100 extends through the pin socket 118 perpendicular to the flat sides of the socket. The pin sockets 118 each are mounted on a flat mounting surface which is parallel to the axis of the socket bore and perpendicular to the flat sides. The pin sockets 118 are mounted in opposed mirror image parallel pairs on flat surfaces of the deck 11 and the damper plate 99 of the platform 10, with the center plane of symmetry between each pin socket 118 pair located on a vertical plane through the longitudinal axis of a leg 26 or 27. The pin sockets 118 of an opposed pair are a fairly close fit to the side plates 137 of the leg end 136 which will be engaged between them, with only about 0.25 inch (6 mm) of clearance. An annular plate ring reinforcing boss on the leg side of each pin socket is concentric with the bore of the pin socket and has a planar transverse sidewall 127 parallel to and facing side plate 137 of the leg end 136.

The socket bore of each pin socket 118 has, starting from the side which the extendable pin enters, a short first frustroconical bore 120, an elongated straight middle cylindrical bore 119, and a second short frustroconical bore 121. The frustroconical bores 120 and 121 are inwardly converging in the direction away from the pin entry and respectively have the same taper angles as first frustroconical shoulder 107 and second frustroconical shoulder 108 of the pin 101. The taper angles, diameters, and axial spacing of frustro-conical bores 120 and 121 are selected so that when a pin assembly 100 is axially thrust into the bore of pin socket 118, the first frustroconical bore 120 of the socket is firmly comated and abutted with the first frustroconical shoulder 107 of the pin and the pin axis is aligned with the bore axis there. The fabrication tolerances of the pin 101 and the pin socket 118 are such that the second frustroconical shoulder 108 of the pin and the second frustroconical bore 121 of the socket comate so that they abut or nearly abut when shoulder 107 is mated with bore 120.

Herein, comating refers to the bringing into close coaxial proximity of two similarly shaped surfaces. For instance, a right circular cylindrical pin having a close slip fit in a right circular cylindrical bore is comated with that bore, even though the two adjacent cylindrical surfaces do not abut.

Abutment occurs between the comating second shoulder 108 and the second bore 121 when the fabrication process results in the minimum allowable spacing between these two faces. This establishes a minimum for a tolerance band for the controlling dimension relating to the axial spacing of the comating surfaces 108 and 121. The size of the tolerance band then determines the maximum axial spacing of the comated surfaces 108 and 121.

A lubricant cavity 126 is formed in the space between the pin 101 and the pin socket 118 when the pin is fully engaged in the socket. This lubricant cavity 126 is between the pin tip clearance region 105 and the middle cylindrical bore 119 and is limited on the pin entry end by the abutting first frustroconical shoulder 107 and the first frustroconical bore 120. The abutment or near abutment of the second frustroconical shoulder 108 of the pin 101 and the second frustroconical bore 121 of the socket 118 limits the lubricant cavity 126 on the side of the socket opposed to the pin entry side. An annular female O-ring groove 124 containing female O-ring 125 is positioned in the second frustroconical bore 121 of the socket 118 near the side of the socket opposed to the pin entry side. O-ring 125 seals against the adjacent second frustroconical shoulder 108 of engaged pin 101, even when the second shoulder is not fully abutted against the second frustroconical bore 121.

When it is formed by the engagement of pin 101 into the pin socket 118, the lubricant cavity 126 communicates with the radial lubricant port 114 on the outer end of the first frustroconical shoulder 107 of the pin and the pin tip lubricant port 115 and is fully sealed by the metal-to-metal contact of the abutting frustroconical shoulder and bore pair 107 and 120 and also with either abutment of shoulder and bore pair 108 and 121 plus the O-ring 125 or only the O-ring 125. When the frustroconical shoulders 107 and 108 of the outer end of the pin 101 are nearly abutting their respective comating frustroconical bores 120 and 121 of the pin socket, frustroconical journal bearings are formed between those surface pairs.

Second Embodiment of the Extendable Pin

Figure 14:
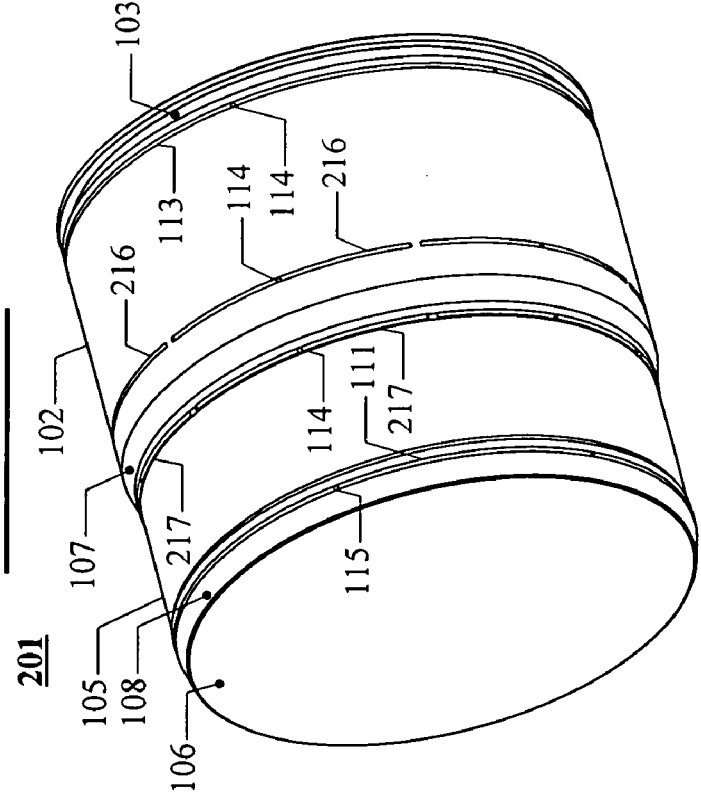
FIG. 14 is an oblique view of a second embodiment of the lubricated extendable pin, wherein the pin is provided with separate, arcuate, independent lubricant injection distribution grooves.

FIG. 14 shows a second, alternative embodiment 201 of the extendable pin. Extendable pin 201 is very similar to the first extendable pin embodiment 101 and is generally equipped the same way. The second embodiment 201 of the extendable pin can be used in either the first 136 or the second 236 embodiments of the leg end. The difference between the two pin embodiments is related to the segmentation of the lubricant injection grooves into separate, independently fed grooves for the alternative pin 201.

Alternative extendable pin 201 has the two of the 360° annular lubricant distribution grooves immediately next to the first frustroconical shoulder 107 of the first extendable pin embodiment 101 each replaced by a circumferentially equispaced coplanar array of separate arcuate short grooves. Segmented grooves 217 are used in place of the single circumferential groove 112, while segmented grooves 216 replace the single circumferential groove 113. Each alternative annular lubricant distribution groove 216, or 217 extends for a limited arc length (e.g., 58° when six arcuate grooves are used) and each is provided with its own separate lubricant injection passage 114. Thus, with the grooves 216 and 217 equispaced around the periphery of the pin, the pin 201 is provided with independent lubricant feed grooves. Each groove 216 or 217 is individually fed with its own lubricant supply by its own dedicated pump and source line, while the lubricant returns follow the same path as for the first extendable pin embodiment 101. The second extendable pin lubricant supply system 500 is used to provide lubricant to the second embodiment of the extendable pin 201 in a manner described in the following material.

Second Embodiment of the Leg End with Face Seals

A second embodiment of the leg end 236 is shown in an oblique partially exploded view in FIG. 15. This second embodiment of the leg end 236 differs from the first embodiment 136 only in having provision for face seals 280 on the outer surfaces of its side plates 237. The structure and operational positions of the first embodiment extendable pin assemblies 100 with second embodiment leg end 236 are shown in FIGS. 16 to 19. Only differences between this assembly of extendable pin assemblies 100 with the leg end 236 and the assembly of the same pins with the leg end 136 are discussed herein. Referring to FIGS. 15 and 16, leg end 236 is provided with a rectangular cross-section annular face seal groove 250 located on the outer transverse side of each of its side plates for mounting a selectably expandable elastomeric face seal 280. The grooves 250 are concentric with the pin housing bores 139 of leg end 236. For each groove 250, a seal stem access hole 251 parallel to the axis of the pin housing bores 139 extends from the inside transverse face of groove 250 through the wall of side plate 237 to the interior or the leg end 236.

Expandable face seal 280 is hollow, expandable, and has a flat external first side that can be attached to the back wall of the groove 250 by adhesive or other fastener means. When deflated, seal 280 is fully recessed within its groove 250 in the side plate 237 of the leg end 236. Seal 280 has inner and outer cylindrical second and third sides and a fourth transverse side of seal 280 that is opposed to the first side of the seal and is corrugated. The seal 280 is hollow inside to permit the selective injection of pressurized fluid therein so that the seal may be caused to extend from its groove 250 to seal against an adjacent body when desired. A hollow cylindrical inflation stem 281 protrudes from the first side of seal 280 and is extended through the seal stem access hole 251 where it is connected to a control line leading to the deck 11 of the platform 10 (not shown). The elastomeric forces in the body of the seal 280 cause the seal to retract back into its groove 250 when its internal pressure is released. The corrugations in the fourth face of the seal 280 cause its outward extension under internal pressure to be primarily due to flexure of its walls, rather than internal circumferential stretching.

An outwardly opening face lubricant injection port 282 parallel to the axis of the pin housing bores 139 is located between the face seal mounting groove 250 on each side plate 237 and the pin housing bore 139 of the leg end 236. The lubricant injection port 282 extends through the wall of the side plate 237 and is counterbored and tapped on the leg end interior side for the sealing threaded engagement of a hydraulic quick connect fitting 117. The lubricant injection port 282 is connected to a lubricant supply line (not shown) extending through the interior of the leg to the deck 11 of the platform 10. Although only one lubricant injection port 282 is shown for clarity in FIGS. 15 to 19, multiple ports typically will be angularly equispaced around the axis of the pin mounting bores 139 in order to ensure good lubricant distribution.

Main Pin Lubricant Supply System 300

Referring to FIG. 20, the main pin lubricant supply system 300 is shown schematically. The reservoir 301, pumps 302, and lubricant analyzer 320 of the lubricant supply system 300 are located on the deck 11 of the platform 10 and are connected to the hydraulic swivel 79 located on the main pin assembly 50 by high pressure tubing or piping pump delivery lines 304. The pump delivery lines 304 include hydraulic hose jumpers (not shown) between the deck 11 and the leg or legs 26 and 27 and also between the legs and the swivel 79 of the main pin assembly 50. For simplicity, the pump delivery lines 304 are shown as simple tubing or pipe lines in FIG. 20. Between adjacent pump delivery lines 304 and close to the pumps 302 is a crossover connection flowline 325 that interconnects the pump lubricant delivery lines 304. Between each pump delivery line 304 in connection with flowline 325 is an intermediate bidirectional two position on/off valves 326 in the crossover connections. Typically a valve 326 is a ball valve with either manual control or an attached selectably operated actuator. When closed, the valves 326 isolate the circuit for each pump 302 from the other pump circuits. When opened, the valves 326 comingle the flows from the individual pumps 302.

Lubricant from the reservoir 301 may be drawn through the lubricant pump suction line 303 by the independently driven pumps 302. The pumps 302 typically are fixed displacement piston pumps driven by variable speed electric motor drives (not shown). The lubricant from each of the pumps 302 is conveyed down a separate pump delivery line 304 to the swivel 79 and then flows to its injection point through a quick connect fitting 68, a jumper hose 307, and another quick connect fitting. Internal to the main pin assembly 50, the set of quick connects 68 and the hose 307 optionally could be replaced by hard piping.

The flow paths 312 and 315 for the different branches of the lubricant flow around the exterior of the main pin 51 each are shown symbolically as a single flow restrictor. From a hydraulic flow viewpoint, this representation of a more complex flow path is acceptable for flow considerations and computations. The flow resistance for a flow path 312 or 315 is dependent upon the average gap in the journal bearing annulus, the eccentricity of the joint, flow rate, lubricant properties, and temperature. The primary differences between the different flow paths will be due to different eccentricities and average annular gaps, with more average gap and more eccentricity lowering the flow resistance for a flow path. Because of the variations between the different flow channels 312 and 315 during leg rotation, it is necessary to utilize independent pumps 302 in order to avoid lubricant starvation for the higher resistance flow paths.

The flow path represented by flow restrictor 312 consists of an outer end lubricant distribution channel 70, an annular lubricant distribution groove 64 at the outer end of the main pin 51, an annulus between the outer end bearing surface 61 and the outer straight bore 30 of the sleeve 29 of the leg 26 or 27, a lubricant collection cavity 67, and a lubricant collection port 71. The flow path represented by flow restrictor 315 consists of a central lubricant distribution channel 80, an annular lubricant distribution groove 64 in the central portion of the main pin 51, an annulus between the central bearing surface 63 and an outer straight bore 30 of the sleeve 29 of the leg 26 or 27, a lubricant collection cavity 67, and a lubricant collection port 71. The flows through the four different annular paths 312 and 315 are collected by a hard pipe 318 connected to the swivel 79 and thence by lubricant return line 319 to the reservoir 301 by way of lubricant analyzer 320 and the return line 321. Lubricant analyzer 320 is used to check the returning lubricant for seawater contamination and salt. Commercially available instruments for evaluating water and salt content of a petroleum stream are used for analyzing the returning lubricant. Additionally, the reservoir 301 level may be monitored to check for flow losses.

For the second embodiment of the main pin 87, most of the details of the lubricant supply system are identical to that used for the first embodiment of the main pin assembly 50. For main pin 87, each arcuate lubricant distribution groove 88 is considered to constitute a separate flow path 312 at the outer ends of the main pin 51 or 315 in the middle of the main pin. The description of the flow paths 312 and 315 would be changed to have an individual arcuate groove 88 in place of a continuous groove 64 and all of the arcuate grooves in a coplanar set would flow to their common lubricant collection cavity 67. A separate lubricant supply system 300 would be required for each set of grooves centered on a given radial plane.

Extendable Pin Lubricant Supply System First Embodiment 400

The extendable pin lubricant supply system 400 is shown schematically for a single pin assembly 100 in FIG. 21. As is the case for the main pin assembly 50, the lubricant reservoir 401, the pumps 402, the lubricant pump suction line 403, and the lubricant analyzer 410 are located on the main deck 11 of the platform 10 and the pumps are connected to the interior of the leg end 136 housing the pin assembly 100 by hard piping and hose jumper pump delivery lines 404 between the deck and the leg 26 or 27 mounting the leg end. Herein, the delivery lines 404 are shown as tubing or pipe for simplicity. Between the two pump delivery lines 404 is a crossover connection flowline 425, also called an interconnection line, with an intermediate bidirectional two position on/off valve 426. Typically valve 426 is a ball valve with either manual control or an attached selectably operated actuator. When closed, the valve 426 isolates the circuit for each pump 402 from the other circuits. When opened, the valve 426 comingles the flows from the individual pumps 402. The connection of the pumps 402 to the pin lubricant manifold 242 on the centerline bulkhead 140 of the leg end 136 is indicated by pump delivery line 404.

Lubricant from the reservoir 401 is drawn through the lubricant pump suction line 403 by the independently driven pumps 402. The pumps 402 typically are fixed displacement piston pumps driven by variable speed electric motor drives (not shown). The flow is delivered to the pin lubricant manifold 242 by the flowlines 404, where each flow stream sequentially passes through a quick connect fitting 117, a pin hydraulic hose 405, and another quick connect fitting before entering an extendable pin 101 flow passage.

The pin flow paths 407 and 408 for the different branches of the lubricant flow around the exterior of the extendable pin assembly 100 each are shown symbolically as a single flow restrictor. From a hydraulic flow viewpoint, this representation of a more complex flow path is acceptable for flow considerations. The flow resistance for a flow path 407 or 408 is dependent upon the average gap in the annulus, the eccentricity of the joint, flow rate, lubricant properties, and temperature. Because of the variations between the flow channels 407 and 408 during extension of the pin 101, it is necessary to utilize independent pumps 402 in order to avoid lubricant starvation for the more restrictive flow paths. Additionally, because it desirable to avoid lubricant loss to the environment during pin extension, it is desirable to prevent or limit lubricant flow to the outer tip of the pin 101 (flow channel 407) for most of the pin extension.

The flow path for the outer portion of the extendable pin assembly 100 represented by flow restrictor 407 consists of a radial lubricant port 114, a clearance region lubricant distribution groove 112, an annulus between the outer portion of the pin 101 and the pin socket 118 including the lubricant cavity 126, a pin tip lubricant groove 111, and a pin tip lubricant port 115. This flow path, shown for the outer portion of the pin assembly 100, is for when the pin 101 is fully abutted in the pin socket 118.

The flow path for the inner end of the pin assembly 100 represented by flow restrictor 408 consists of a radial lubricant port 114 on the inward side of the first frustroconical shoulder 107, an annular bearing surface lubricant groove 113 on the inward side of the shoulder 107, an annulus between the main body bearing surface 102 and the pin housing bore 139, a second annular bearing surface lubricant groove 113 adjacent the O-ring groove 103, and the radial lubricant port 114 connected to the second groove 113. The flows through the two different annular paths 407 and 408 each are routed separately through quick connects 117 and hoses 405 back to the pin lubricant manifold 242, where they are recombined to return to the reservoir 401 by way of lubricant return line 411, lubricant analyzer 410, and the return line 412. The lubricant analyzer 410 functions in the same manner as the lubricant analyzer 320.

When the pin 101 is almost abutted against the pin socket 118, the flow of the equivalent flow restrictor 407 is able to leak lubricant through the gaps between the adjacent frustroconical surfaces, thereby creating journal bearings there. This leak path is not shown in FIG. 21. Permitting this lubricant flow to escape is important for the proper lubrication of these frustroconical journal bearings. Since typically a very viscous lubricant, such as a heavy grease, is used in the lubrication system, there is minimal escape to the environment during this operation.

Second Extendable Pin Lubricant Supply System 500

Figure 22:
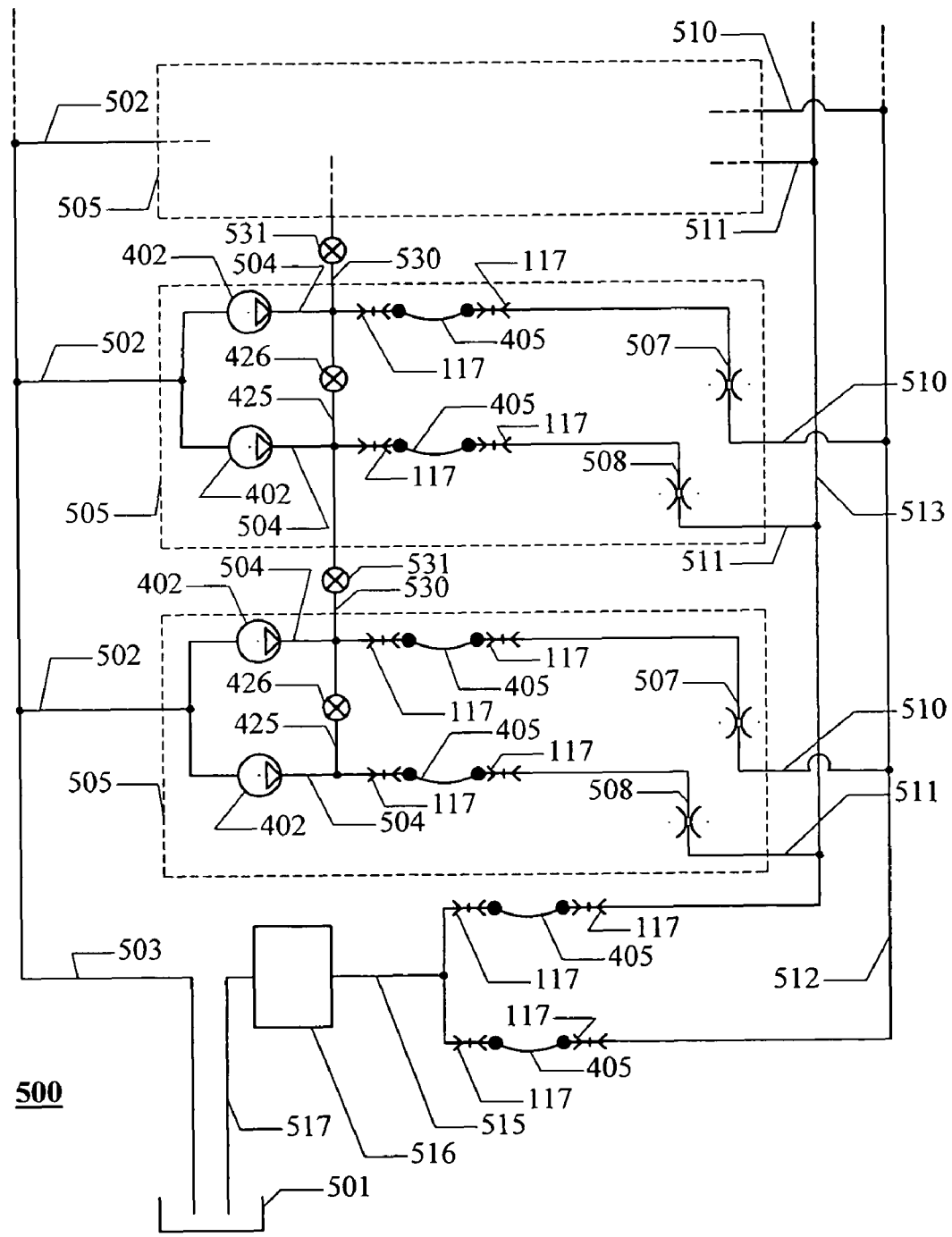
FIG. 22 is a schematic representation of the lubricant flow system for the second embodiment of the selectably extendable pin shown in FIG. 14.

The extendable pin lubricant supply system 500 for the second embodiment of the extendable pin 201 is shown for a single pin in FIG. 22. This embodiment of the extendable pin 201 utilizes multiple discrete arcuate grooves 216 and 217 as distributor grooves to serve as independent lubricant injection points while utilizing the same lubricant collection grooves 111 and 113 as in the extendable pin lubricant supply system for the first embodiment of the extendable pin 101. In most respects, lubricant supply system 500 closely resembles lubricant supply system 400; the two systems have several components in common. For lubricant supply system 500, main suction line 503 draws lubricant from the reservoir 501 and supplies it to the multiple branch lubricant supply lines 502 which supply the individual lubricant delivery subsystems 505 feeding a single pair of arcuate grooves 216 and 217. There is a separate lubricant delivery subsystem 505 for each of the groove pairs 216 and 217 and a separate pump 402 for each arcuate groove. The reservoir 501, the main suction line 503, the branch lubricant pump supply lines 502, the pumps 402, the lubricant analyzer 516, and the on/off valves 426 and 531 are all located on the deck 11 of the platform 10. The circuit 500 represents the situation when the pin 201 is fully abutted in the pin sockets 118.

Each individual lubricant delivery subsystem 505 has two pumps 402 draw lubricant from the branch lubricant supply line 502 which supplies the delivery subsystem. The branch lubricant supply line 502 bifurcates in the subsystem 505 in order to supply the pumps 402. Each pump 402 is independently driven. The pumps 402 typically are fixed displacement piston pumps driven by variable speed electric motor drives (not shown). Their flows are delivered to the pin lubricant manifold 242 by the flowlines 504, where each flow stream sequentially passes through a quick connect fitting 117, a pin hydraulic hose 405, and another quick connect fitting before entering a extendable pin 201 flow passage.

Between the two pump delivery lines 504 immediately downstream of the pumps 402 in the lubricant delivery subsystem 505 is a crossover connection 425 with an intermediate bidirectional two position on/off valve 426. Typically valve 426 is a ball valve with either manual control or an attached selectably operated actuator. When closed, the valve 426 isolates the circuit for each pump 402 from the other pump circuits in subsystem 505. When opened, the valve 426 comingles the flows from the two pumps 402 of the subsystem 505. The connection of each of the pumps 402 to the pin lubricant manifold 242 on the centerline bulkhead 140 of the leg end 136 is indicated by pump delivery line 504. The pump delivery line 504 typically consists of both tubing or pipe and hydraulic hose jumpers between the deck 11 and the leg 26 or 27.

The pin flow paths 507 and 508 for the different pairs of arcuate grooves 217 and 216 and their respective branches of the lubricant flow around the exterior of the second embodiment extendable pin 201 each are shown symbolically as single flow restrictors. From a hydraulic flow viewpoint, this representation of a more complex flow path is acceptable for flow considerations. The flow resistance for a flow path 507 or 508 is dependent upon the average local gap in the annulus for that flow path, flow rate, lubricant properties, and temperature. Because of the variations between the pairs of flow channels 507 and 508 during extension of the pin 101, it is necessary to utilize independent pumps 402 in order to avoid lubricant starvation for the more restrictive flow paths. Additionally, because it desirable to avoid lubricant loss to the environment during pin extension, it is desirable to prevent or limit lubricant flow to the outer tip of the pin for most of the pin extension.

The flow path for the outer portion of the extendable pin 201 represented by flow restrictor 507 consists of a radial lubricant port 114, a clearance region arcuate lubricant distribution groove 217, an annular region between the outer portion of the pin 201 and the pin socket 118 including the lubricant cavity 126, a pin tip lubricant groove 111, and a pin tip lubricant port 115. The flow path for the inner end of the pin assembly 100 represented by flow restrictor 408 consists of a radial lubricant port 114 on the inward side of the first frustroconical shoulder 107, an arcuate annular surface lubricant groove 216 on the inward side of the shoulder 107, an annular region between the main body bearing surface 102 and the pin housing bore 139, a second annular bearing surface lubricant groove 113 adjacent the O-ring groove 103, and the radial lubricant port 114 connected to the second groove 113.

For each delivery subsystem 505, the flow through the annular path 507 is routed through an outer end lubricant exhaust line 510 which tees into a main first lubricant collector line 512 common to all of the delivery subsystems. For each delivery subsystem 505, the flow through the annular path 508 is routed through an inner end lubricant exhaust line 511 which tees into a main second lubricant collector line 513 common to all of the delivery subsystems. The first lubricant collector line 512 and the second lubricant collector line are each joined by quick connects 117 and hoses 405 back to the pin lubricant manifold 242, where they are recombined to return to the reservoir 501 by way of lubricant return line 515, lubricant analyzer 516, and the return line 517. The lubricant analyzer 516 functions in the same manner as does the lubricant analyzer 320.

Again, when the pin 201 is not fully abutted into pin socket 118, the flow branch with flow path 507 leaks to the outside environment between the frustroconical journal bearings formed between the pin and its socket. This is not shown in FIG. 22, but provides desirable lubrication. The use of a very viscous lubricant, such as a heavy grease, minimizes excess flow of the lubricant to the environment.

The lubricant supply system 500 can be operated with only a single pump 402 during periods of pressure maintenance when the pin 201 is fully engaged in its pin socket 118 and a hydrostatic bearing is not required between the pin 201 and its pin socket 118 or the pin and its pin mounting bore 139. In order to permit this single pump operation, a crossover-connector line 530 interconnects one of the two pump delivery lines 504 immediately downstream of a pump 402 to one of the two pump delivery lines 504 immediately downstream of a pump 402 in an adjacent lubricant delivery subsystem 505. This is done so that all delivery subsystems 505 are connected to at least one other delivery subsystem. Intermediate in each cross-connector line 530, a selectably operable bidirectional two position on/off valve 531 is positioned. Typically each valve 531 is a ball valve with either manual control or an attached selectably operated actuator. When closed, the valve 531 isolates the pump delivery lines 504 from each other. When opened, the valve 531 comingles the flows from the two pumps 402 of the separate but adjacent subsystems 505.

Extendable Pin Lubricant Supply System 600 for Use with Face Seals

Figure 23:
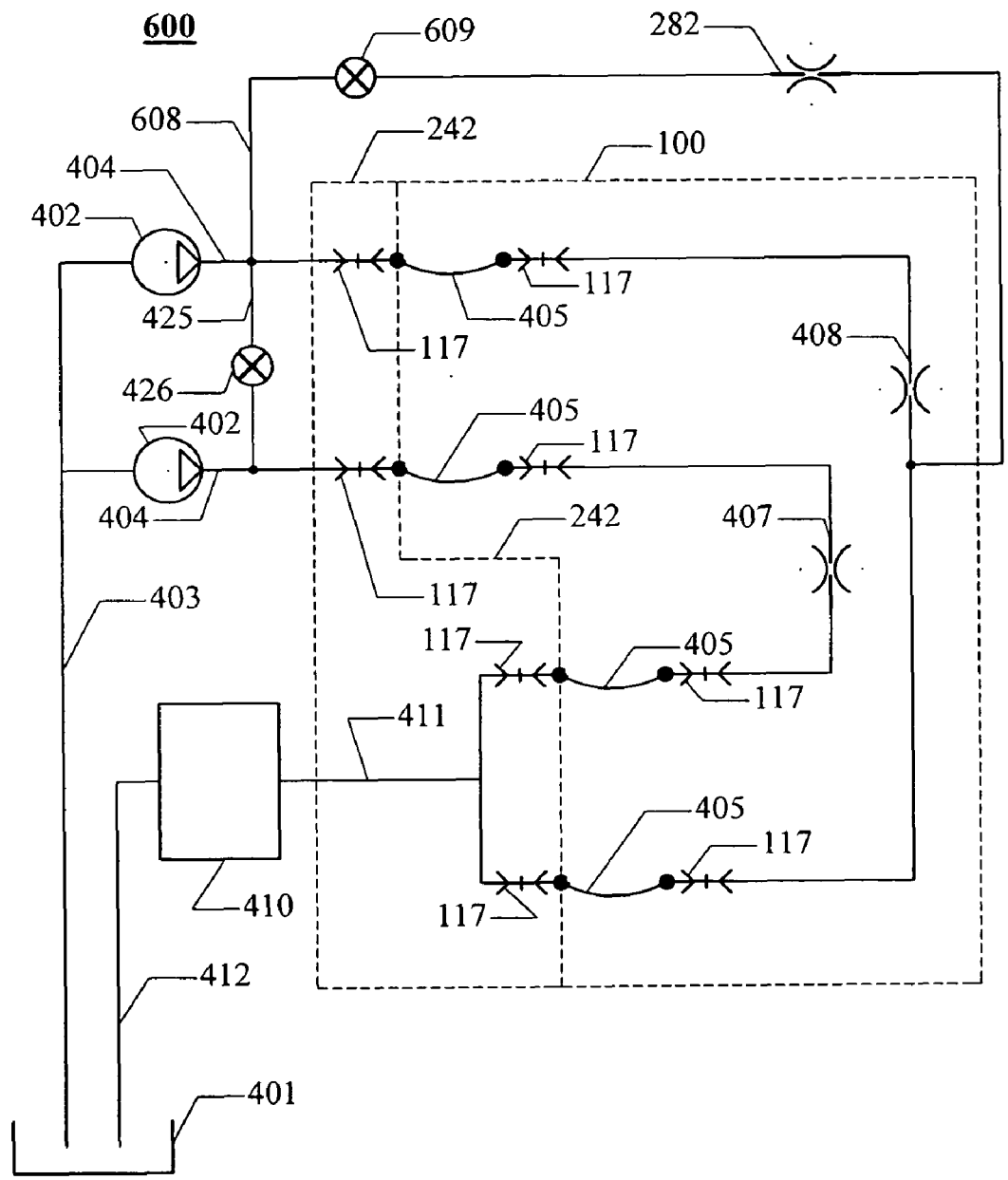
FIG. 23 is a schematic representation of the lubricant flow system for the second embodiment of the leg end with the first embodiment of the expandable pin shown in FIGS. 16 to 19.

The lubricant supply system 600 for use with the first pin assembly embodiment 100 and the second embodiment of the leg end 236 with the face seals 280 is shown in FIG. 23. The system 600 is shown only for a single extendable pin 101. Lubricant supply system 600 is the same as the lubricant supply system 400 except for the addition of a separate flow branch to feed and fill the region between the lubricant seal 280, the side plate 237 of the leg end 236, and the transverse sidewall 127 of the pin socket 118. The lubricant supply system 600 shows the flow circuit when the pin 101 is fully abutted with the pin socket 118.

The pump delivery line 404 for the pump 402 which feeds the journal bearing at the inner end of the pin 101 (flow path 408) is intersected just downstream of the pump by a branch line 608. This connection point can be the same as where the cross-connector line 425 intersects delivery line 404 or it can be a separate tee connection. Branch line 608 contains selectably operable two-position on/off valve 609 upstream of face seal injection port 282. Herein, flow port 282 is shown as a flow restrictor in order to indicate its flow resistance. For simplicity, the flow resistance of the connecting line 608 to the quick connect fitting 117 in the injection port 282, the quick connect fitting 117, the injection port 282 itself, and the annular gap between the side plate 237 of the leg end 236 and the sidewall 127 of the pin socket 118 are all combined into the nominal resistance of the port 282.

When face seal 280 is actively sealing against the pin socket 118, outflow through injection port 282 can only pass into the annulus between the main body bearing surface 102 of the pin 101 and the pin mounting bore 139 of the leg end 236 or between the outer end of the pin and the pin socket. For flow to occur into the annulus between the pin main bearing surface 102 and the pin housing bore 139, the annular female selectably inflatable seal 142 must be relaxed so that the lubricant flow from port 282 can bypass that seal. The flow from the face seal region is combined with the flow through the flow restrictor 407 as it moves through the annulus for collection in the annular groove 113 adjacent the O-ring 103 of the pin 101. Again, when the pin 101 is not fully abutted with the pin socket 118, leakage of lubricant can occur from the flow path 407. This lubricant leakage is desirable for lubricating the frustroconical journal bearings formed between the frustroconical surfaces of the pin 101 and the pin socket 118.

OPERATION OF THE INVENTION

Main Pin Assembly First Embodiment

The operation of the first embodiment of the main pin assembly 50 is described with reference to the FIGS. 3, 4, and 5. The main pin assembly 50 has to operate under two separate conditions. The first operational condition for the main pin is when the legs 26 and 27 are being rotated relative to each other about the axis of the main pin assembly 50. One or both legs 26 and 27 will move relative to the main pin 51 when such a rotation occurs. While the buoyancy of the second leg 27 is adjusted during its assembly operation offshore so that it is approximately neutrally buoyant and produces very little net load on its connection to the main pin assembly 50, pin loadings from waves and variations in buoyancy during leg rotation will be present. In order to avoid galling under load of the mating bearing surfaces 61 and 63 of the pin and 30 of the legs 26 and 27, lubricant is injected into the interfaces between these mating bearing surfaces using the main pin lubricant supply system 300 shown in FIG. 20.

In order to establish hydrostatic bearings in the journal bearing annular spaces between the mating cylindrical bearing surfaces 61 and 63 of the pin 51 and 30 of the legs 26 and 27, high pressure delivery for the lubricant is necessary. Accordingly, independently driven pumps 302 draw their lubricant from reservoir 301 by way of suction line 303 and deliver it to the four different main pin bearing zones 312 and 315 by way of the swivel 79, quick connects 68, and hoses 307. Independent pumps 302 are desirable because each lubricant flow path 312 or 315 will tend to have a different effective gap and hence a different flow resistance. Provision of independent pressure sources thus avoids one or more of the lubricant flow paths 312 and 315 for the bearing surfaces accepting most of the lubricant flow due to its having a low flow resistance, thereby tending to starve the other journal bearing annuli. With the injection of the lubricant, the bearing surfaces are at a minimum lubricated so that galling is prevented.

If sufficiently high delivery pressures are provided, the mating bearing surfaces will have minimal or no contact during rotation of the legs due to the formation of hydrostatic bearings, leading to the desirable very low frictional resistance to the leg rotation. A large pressure drop occurs between the lubricant injection point and its withdrawal point for each annular bearing zone. The seals 32 which seal between the straight bores 30 of the sleeves 29 of the legs 26 and 27 and the comating pin bearing surfaces 61 and 63 prevent escape of lubricant to the environment and cause it to be returned by way of the hoses 307 and swivel 79 to the reservoir 301.

As described previously, after the rotation of the second legs 27 is completed so that the lower leg ends 136 of the second legs can be latched to the damper plate 99, the main pin assembly 50 is immobilized and does not need to rotate during service of the installed platform 10. However, the main pin assemblies 50 are submerged in highly corrosive seawater and will have to be rotated at a later time in order to disassemble and remove the platform 10. This in-service condition is the second operational condition for the main pin assembly 50.

For this second operational condition, it is desirable to maintain lubricant and exclude water in the annuli between the main pins 51 and their associated tubular sleeves 29 of the legs 26 and 27. The annuli are sealed at their ends by the O-rings 32, so only a slight lubricant overpressure in excess of the hydrostatic head at the depth of the pin assemblies 50 plus a reasonable allowance for wave-induced pressure variations is required.

Referring to FIG. 20, a single pump 302 can deliver the necessary pressure if it is connected to all of the lubricant feed lines 304. This nonrotational condition for the first main pin embodiment 50 has all the outlet lines 304 for the pumps 302 interconnected in order to permit this single pump operation. By opening all of the on/off valves 326 in the crossover connection flowline 325, all the pump outlet lines 304 are placed in communication. Then with only a single pump 302 running, adequate lubricant overpressure on the main pin assembly 50 can be readily maintained for the nonrotational condition.

The lubricant is fed in a closed loop circuit by the main lubricant supply system 300, so that any losses will be due to leaks, with the seals 32 being the most likely possible cause. Compensation for small leaks can be provided by slightly increasing the circulation pressure. The lubricant returning from the main pin assembly 50 passes through collector line 318, swivel 79, and lubricant return line 319 to lubricant analyzer 320. Lubricant analyzer 320 checks the lubricant for salt or water contamination before it is returned to the reservoir 301, thus alerting personnel and thereby permitting remedial action. A variety of commercially available instruments can be used to ascertain if contamination is present in the returning lubricant flow.

Main Pin Assembly Second Embodiment

For the case of the second embodiment of the main pin 87 shown in FIGS. 6, 7, and 8, the configuration and operation of the main pin lubricant flow circuit 300 is slightly modified. The second embodiment of the main pin 87 is utilized whenever construction of the sleeves 29 of the legs 26 and 27 and of the main pin 87 results in large annular gaps between the bearing surfaces 30 of the sleeve and 61 and 63 of the main pin, or in the case when high pin loads are expected during leg rotation.

During leg rotation for main pin 87, an independently driven pump 302 supplies each arcuate lubricant injection groove 88. This approach is so that none of the flow zones adjacent the individual grooves 88 in a coplanar set are lubricant starved by less restricted flow paths between their outer lubricant distribution channels 70 and outer collection ports 71 or between their central lubricant injection channels 80 and their central collection ports 71. The main pin lubricant flow circuit 300 is modified for this situation by simply adding an additional pump 302 and an injection point for each arcuate groove 88. All of the outer end arcuate lubricant injection grooves 88 on an outer end of main pin 87 flow to the single annular lubricant collection cavity 67 on that end of the main pin 87. All of the inner end arcuate lubricant injection grooves 88 flow to their adjacent single annular inner end lubricant collection cavities 67.

The nonrotational condition for the second main pin embodiment 87 only requires that one pump deliver lubricant, so all the outlet lines 304 for the pumps 302 could then be interconnected in order to permit this by opening all of the on/off valves 326 in the crossover connection flowline 325. With only a single pump 302 running, adequate lubricant pressure on the main pin 87 can be readily maintained for the nonrotational condition.

Extendable Pin Assembly First Embodiment 100

The operational situation of the extendable pin assemblies 100 shown in FIGS. 9 to 13 is similar to that of the main pin assembly 50, in that there is a first dynamic operational phase and then a second static operational phase. For the first, dynamic phase of operation, the interface between the main body bearing surface 102 of the pin 101 and the pin housing bore 139 form a journal bearing that should be lubricated and a hydrostatic bearing condition maintained in that interface to allow the pin 101 and pin housing bore 139 to sustain very high lateral loads due to misalignment of the pin and its mating pin socket 118. For the second, static operational phase, the lubricant must be maintained at a slight overpressure to prevent seawater infiltration.

When the extendable pin assembly 100 is to be moved using its hydraulic cylinder 260, it is to be expected that it will experience very high lateral loads in the event of axial misalignment between the pin 101 and the bore of the pin socket 118. Other than prelubrication during preassembly of the platform 10 and circulation of lubricant between the pin housing bore 139 and the outer diameter of the pin 101 behind the inflatable seal 142, the outer tip of the pin cannot be successfully lubricated until it is almost fully engaged with the pin socket 118. However, the maintenance of a hydrostatic bearing in the annulus between bearing surface 102 of the pin 101 and pin housing bore 139 is possible at all times during axial pin movement. This is accomplished with the extendable pin lubricant supply system 400. Prior to initially extending the pin assembly 101, the inflatable seal 142 is relaxed sufficiently so that it will not wipe too much lubricant from the surface of the outer end of the pin 101.

Lubricant supply system 400 for the first embodiment of the extendable pin assembly 100 draws lubricant from its reservoir 401 to its pumps 402 through the suction line 403. The pump 402 supplying lubricant to the inner end of the pin 101 (the lubricant flow path 408) by delivery line 404, pin lubricant manifold 242, the quick connects 117, and the hose 405 delivers the lubricant at a sufficiently high pressure that a hydrostatic bearing is established for the journal bearing. The lubricant flow path 408 for the hydrostatic bearing runs from the radial lubricant port 114 on the interior side of the first frustroconical shoulder 107 into the intersecting annular groove 113, from there through the annulus between the pin bearing surface 102 and the pin housing bore 139 to the second annular groove 113 adjacent the O-ring 104, and out through the radial lubricant port 114 intersecting that second groove 113. When the extendable pin assembly 100 is nearly engaged with the bore of the pin socket 118, the second pump 402 feeding the lubricant flow path 407 is started. This condition of being nearly engaged is assumed to occur approximately 1 inch (25 mm) from full abutment of the first pin shoulder 107 with the first frustroconical bore 120 of the pin socket 118.

The second lubricant path 407 is through the lubricant cavity 126 located between the outer tip of the pin 101 and the bore of the pin socket 118. Circulation through the second lubricant path 407 at the outer end of the pin 101 can help with establishing dynamic lubrication of the seating of the pin in the pin socket 118, since lubricant and water can flow past the O-ring 125 of the pin socket 118 and past the shoulder 107 which will be comated with the first frustroconical bore 120 of the pin socket. Restricting the return flow emerging through pin tip lubricant port 115 from the lubricant cavity 126 promotes the flow of lubricant around the pin tip and thereby assists in elimination of any trapped water. This restriction can be accomplished by reducing the diameter of pin tip lubricant port 115 to a size smaller than the other radial ports in the extendable pin 101. As an option, a selectably operable on/off valve is added to that flow branch outlet. When the pin 101 is fully abutted in pin socket 118, the flow branch with flow restrictor 407 is isolated from the environment.

If it is desired to rotate the connection between the pin 101 and the pin socket 118 about the longitudinal axis of the pin, it can be accomplished readily in the following way. Assume that prior to the initiation of rotation, the pin 101 has its first frustroconical shoulder 107 fully seated against the comating first frustroconical bore 120 of the pin socket 118.

By axially retracting the pin 101 slightly from its engagement with the pin socket 118, a gap is produced between the first frustroconical shoulder 107 of the pin and the first frustroconical bore 120 of the pin socket, as well as between the second frustroconical shoulder 108 of the pin and the second frustroconical bore 121 of the pin socket. By blocking the flow outlet port 115 from the annular lubricant cavity 126 between the pin 101 and the socket 118, high pressure lubricant injected through the radial port 114 into that cavity 126 will tend to produce a hydrostatic bearing between the nearly comated frustroconical surfaces. If the transverse loads on the pin 101 are not excessive and a sufficiently high lubricant injection pressure is used, the hydrostatic bearing thus formed can be maintained during rotation about the pin axis. Although it is not shown herein, provision of catchment means for the capture of escaping lubricant can avoid environmental damage and the expense of lost lubricant for a prolonged rotation operation.

Following completion of the rotation about the pin connection, the pin 101 can be reseated into the pin socket 118. Although it is not shown herein, the pin 101 typically is provided with a key mated with a corresponding keyway connected to the pin housing bore 139 or other similar antirotation means. After the extendable pin assembly 100 is fully seated in the socket, lubricant cavity 126 is isolated from the external environment firstly by the abutment of shoulder 107 of pin 101 against bore 120 of pin socket 118 and secondly by the sealing of O-ring 124 of the pin socket against the second shoulder 108 of the pin. At that point, the extendable pin 101 is static and the lubricant overpressure maintenance can begin.

Typically, one of the pumps 402 is turned off whenever the on/off valve 426 is opened, thereby opening the normally closed crossover connection flowline 425 that interconnects the two pump delivery lines 404. The remaining active pump 402 can have its delivery rate slowed, and returning lubricant from the closed system 400 can be monitored by lubricant analyzer 410. Adjustment of either or both the pumping rate and the backpressure on the lubricant return line 411 can produce the desired system overpressure over the external hydrostatic pressure.

Second Embodiment of Extendable Pin 201

For the second embodiment of the extendable pin 201 shown in FIG. 14, the lubricant flow circuit 500 in FIG. 22 is used to supply the pin. For this arrangement, a separate lubricant supply subsystem 505 consisting of a pair of independently driven pumps 402 and their attendant connecting flow fittings and conduits 117, 405 separately supply coplanar annular groove segments 216 and 217. One pump 402 of the subsystem feeds an outer end lubricant flow path 407 and the other feeds the inner end lubricant flow path 408. Other than the provision of multiple lubricant distribution grooves 216 and 217, along with their separate lubricant supply circuits, in place of annular grooves, the operation of the second embodiment of the extendable pin 201 is the same as for pin 101 unless otherwise noted in the description below. In the case of lubricant supply circuit 500, each flow path 407 originates at a radial lubricant port 114 on the outer side of the first frustroconical shoulder 107 of the pin 201. For this case, each flow path 408 originates at a radial lubricant port 114 on the inward side of the first frustroconical shoulder 107 of the pin 201. The outlets for the flow paths 407 and 408 for all the segmented grooves are common. Thus flow path 407 exits from lubricant cavity 126 through an annular groove 111, as was the case for the first extendable pin embodiment 101. Similarly, flow path 408 exits through the annular groove 113 adjacent the O-ring 104 on the pin 201.

The lubricant supply subsystems 505 have their pumps 402 draw their lubricant from the reservoir 501 through suction line 503 which is branched with a branch lubricant supply line 502 bifurcated to feed the individual pumps. The outlet 510 of the flow path 407 for each subsystem 505 is collected in schematic common flow path 512 and returned through the same flow conduit as before for the lubricant flow circuit 400 for the first extendable pin embodiment 101. The outlet 511 of the flow path 408 for each subsystem 505 also is collected in a schematic common flow path and returned through the same flow conduit as before for the lubricant flow circuit 400 for the first extendable pin embodiment 101. The lubricant analyzer 516 is used to monitor the condition of the return lubricant flow. The maintenance of overpressure in the system 500 is done in the same way as for the lubricant supply system 400. With all of the crossover on/off valves 426 open and also all of the cross-coupling valves 531 open, a single pump 402 can maintain pressure for the entire system 500.

Second Embodiment of Leg End with Face Seals

The lubricant supply system 600 for the second embodiment of the leg end 236 is very similar to system 400 for the first leg end 136 and the first embodiment of the pin 101. The only basic difference is the provision of a separate branch 608 from the circuit used to supply the interior end of the pin. Refer to FIGS. 15 to 19 and 23 for the operational description. This separate branch 608 has a selectably operable on/off control valve 609 which is normally closed with the pin assembly 100 retracted into its pin housing bore 139 of the leg end 236. Similarly, the on/off valve 426 is closed to block the crossover line 425 between the pump delivery lines 404.

In order to initiate movement of the pin for the first dynamic phase of the pin operation, the annular inflatable seal 104 of the leg end 236 is first slightly relaxed so that it will wipe less lubricant from the prelubricated outer end of the pin 101 as the pin is extended by the hydraulic cylinder 260. At the same time, the inflatable face seal 280 is inflated to lightly seal against the transverse sidewall 127 of the pin socket 118. The pump 402 which feeds the inner end of the pin is then started at a low circulation rate. This pump 402 feeds the portion of the circuit with the lubricant flow path 407 shown in FIG. 23. Next, lubricant injection through flow branch 608 and face lubricant injection port 282 is started by opening on/off valve 609. Because inflatable face seal 280 is sealingly engaged, displaced water and lubricant are directed toward the gap between the pin 101 and the pin socket 118 by the lubricant injected through the port 282.

After these preliminaries, the cylinder 260 then initiates outward extension of the pin 101. Continuing outward extension of the pin 101 further directs displaced water and lubricant through the annular gap between the pin 101 and the pin socket. When the first frustroconical shoulder 107 of the pin 101 begins to engage the inflatable seal 142, the inflation pressure of that seal is substantially increased and the flow rate of the pump 402 feeding the inner end of the pin is also substantially increased. This is necessary because this is when the effects of misalignment between the pin 101 and the pin socket 118 cause high side loads on the pin. When the pin 101 is within approximately 1 inch (25 mm) of seating in the socket 118, the second pump 402 which feeds the outer end of the pin 101 is started. This causes lubricant from the second pump 402 to aid displacing water from the space between the outer end of the pin 101 and the bore of the pin socket 118. As the pin 101 gets closer to abutment with the socket 118, lubricant injected by the second pump 402 into the gap between the outer end of the pin and the pin socket begins to flow over and lubricate the surfaces which will abut when the pin is fully extended, thereby easing the contact of the abutting surfaces.

After the first frustroconical shoulder 107 of the pin 101 abuts the first frustroconical bore 120 of the pin socket, the annular path between those abutting surfaces is substantially closed to fluid flow. Likewise, at that time the O-ring 125 of the pin socket 118 seals against the second frustroconical shoulder 108 of the pin 101 and the second frustroconical bore 121 of the pin socket also abuts or nearly abuts the shoulder 108, so that annular path is also closed. This abutted condition is the static operational engaged position for the extendable pin 101. Lubricant flow can then be established in a closed loop through the lubricant flow path 407. After full abutment is obtained, the annular inflatable seal 142 can be fully deflated to enable lubricant flow to pass from the face lubricant injection port 282 into the annulus between the pin bearing surface 102 and the pin housing bore 139 of the leg end 236. Additionally, lubricant flow can be continued through the lubricant flow path 408. The circulation of lubricant at a desired overpressure above hydrostatic at the pin level can be provided by a single pump 402 by opening the on/off valve 426 in the crossover line 425 joining the two pump delivery lines 404 and turning off the other pump. The lubricant analyzer 410 monitors the return flows from the pin 101 so that water intrusion can be recognized and corrective measures taken.

ADVANTAGES OF THE INVENTION

The pin lubrication system of the present invention offers numerous advantages over the conventional simple pregreasing of pin connection components that is used for typical pin connections. By providing continuously circulating lubricant to the jounal bearings in the pin connections, the likelihood of the bearing surfaces of the pin connections becoming galled or fretted is greatly reduced. Additionally, provision of continuously circulating high viscosity lubricant under high pressure into the journal bearing annuli between bearing surfaces of the pin connections in order to produce a hydrostatic bearing condition markedly reduces frictional resistance to relative movements on the bearing interfaces. This reduction of friction applies to rotary motion about the axis of a pin connection as well as to axial reciprocation of the pin.

For the main pins of the present invention which only rotate a small amount at irregular intervals but which can be subjected to large loads when rotating, reduction of rotating friction is important in order to avoid stick/slip behavior. Irregular motion due to stick/slip behavior can interfere with obtaining the necessary alignment of the legs supported by the main pins during platform assembly. For the extendable pins of the present invention, reduction of rotating friction by the formation of a hydrostatic journal bearing is also important for permitting free rotation of the rigidized subassembly of the legs and the damper plate when that subassembly is rotated underneath the floating deck during platform assembly.

Reduction of friction through formation of a hydrostatic bearing for aiding axial engagement and disengagement of the extendable pins of the present invention is very critical. This is particularly true for the bearing surface of the pin housed within the pin housing bore of the leg end, but it is also true for the pin entering full engagement with its comating pin socket. This reduction of friction is appreciably larger than that obtainable by simply pregreasing the pin. By reducing the resistance to axial movement of the extendable pins, they can be moved readily even when subjected to the very high lateral loads. This in turn has a significant impact on the size of the hydraulic cylinder used to activate the expandable pins and the required strength of the cylinder attachment points.

For both the main pins and the extendable pins, the use of independently supplied multiple coplanar arcuate lubricant injection grooves in place of continuous annular grooves offers improved control for maintaining hydrostatic bearing conditions between a pin and its housing. Normally for a pin connection, the most highly loaded portion of an annular bearing zone is also the most flow restrictive and hence the portion of the bearing zone receiving the least lubricant for a single annular lubricant injection groove. By providing each arcuate lubricant injection groove with its own fixed displacement lubricant flow supply, the most highly loaded portion of the pin connection still is able to receive adequate flow for the maintenance of a hydrostatic bearing there.

The isolation of the pin connections from their external environment by sealing around them and then continually circulating lubricant under pressure around the pins and within their sockets or mounting bores is particularly advantageous in a marine environment. The exclusion of water from the pin connections by filling the connections with lubricant and then continually circulating the lubricant permits monitoring of the lubricant for contamination so that remedial action can be taken. The use of a face seal to confine lubricant between the closely spaced lateral faces of the leg end and the pin socket in the vicinity of the pin substantially eliminates a crevice which is highly prone to severe marine corrosion and which is difficult to protect by cathodic protection.

By continually lubricating the pin connections of the present invention, the mechanism of the pin-connected platform can be maintained in good operational condition for very extended periods. Further, with lubrication maintained on the pin connections, the wear of the connections from the small relative motions induced by flexure and working of the platform in response to wave action is substantially eliminated. These and other advantages will be obvious to those skilled in the art.

As may be recognized readily by those skilled in the art, minor changes may be made to the pin lubrication system and the pins without departing from the spirit of the invention. For instance, for the second embodiment of the extendable pin, the arcuate lubricant injection grooves could be provided only on the inner end of the pin which remains engaged in the pin housing bore of the leg end. The second embodiment of the extendable pin could be used with the leg end having the face seals. Furthermore, different types of selectably inflatable seals could be substituted without departing from the spirit of the invention. A variety of lubricants can be selected for different environments, although typically a very viscous lubricant such as grease is preferred. The details of the hydraulic circuits for lubricant circulation can be varied by using different types of pumps or valves or flow conduits. These and other minor changes do not depart from the spirit of the present invention.

What is claimed is:

1. A lubrication system for lubricating a joining mechanism for reciprocably joining two structural elements including:
   a) a first structural element having a pin housing bore mounting a selectably extendable pin, wherein the pin has a first cylindrical segment and a second cylindrical segment with the second cylindrical segment having a frustroconical portion;
   b) a second structural element having a pin socket bore for selectively engaging a portion of the second cylindrical segment of the pin, wherein the pin socket bore has a frustroconical segment that is comateable with the frustroconical portion of the second cylindrical segment of the pin;
   c) a sealed first bearing annulus formed between the first pin segment and the pin housing bore, wherein the sealed first bearing annulus has a first set of coplanar arcuate lubricant distribution grooves at a first sealed end of the first bearing annulus and a first continuous annular lubricant collection groove at a second sealed end of the first bearing annulus;

d) a sealed second bearing annulus formed between the selectively engagable portion of the second cylindrical segment of the pin and the pin socket bore whenever the frustroconical portion of the second cylindrical segment of the pin is comated with the frustroconical segment of the pin socket bore, wherein the sealed second bearing annulus has a second set of coplanar arcuate lubricant distribution grooves at a first sealed end of the second bearing annulus and a second continuous annular lubricant collection groove at a second sealed end of the second bearing annulus; and e) a lubricant circulation system for continuously circulating lubricant through the sealed first and second bearing annuli.

2. The lubrication system of claim 1, wherein the lubricant circulation system includes a reservoir containing a lubricant, multiple lubricant pumps, multiple lubricant delivery lines, a lubricant return line, and a lubricant monitor.

3. The lubrication system of claim 2, wherein an independently operable lubricant pump injects lubricant into each lubricant distribution groove of the first and second sets of arcuate lubricant distribution grooves.

4. The lubrication system of claim 3, wherein lubricant injected into each of the first set of lubricant distribution grooves lubricates the first bearing annulus and exits through the first collection groove and lubricant injected into each of the second set of lubricant distribution grooves lubricates the second bearing annulus and exits through the second collection groove.

5. The lubrication system of claim 1, wherein the first and second ends of the first bearing annulus are sealed with annular seals.

6. The lubrication system of claim 1, wherein the first end of the second bearing annulus is sealed with by a metal-to-metal contact between the comated frustroconical portion of the pin and the frustroconical segment of the pin socket bore and the second opposed end of the second bearing annulus is sealed with an annular seal.

7. The lubrication system of claim 1, wherein the lubricant circulation system includes a lubricant reservoir, an independently operable pump injecting lubricant into each lubricant distribution groove of the first and second sets of lubricant distribution grooves, a lubricant return line from the first collection groove, a lubricant return line from the second collection groove, and a lubricant monitor for comparing the lubricant from the lubricant reservoir with the lubricant from the first and second collection groove.

8. The lubrication system of claim 1, wherein the lubricant circulation system includes an independently operable pump supplying each lubricant distribution groove of the first and second bearing annuli.

9. The lubrication system of claim 8, wherein the lubricant circulation system introduces pressurized lubricant into the first and second sets of lubricant distribution grooves and removes lubricant from the first and second collection grooves.

10. The lubrication system of claim 9, wherein lubricant removed from the first collection groove is compared to the lubricant introduced into the set of first distribution grooves for compositional variations.

11. The lubrication system of claim 10, wherein lubricant removed from the second collection groove is compared to the lubricant introduced into the second set of lubricant distribution grooves for compositional variations.

12. The lubrication system of claim 10, wherein the lubricant removed from the first and second collection grooves is monitored for salt or water content.

13. A lubrication system for a cylindrical pin connection comprising:

a) a pin housing having a housing bore;

b) a socket member having a receiving bore, wherein the receiving bore has a frustroconical segment;

c) a cylindrical pin with a first cylindrical segment and a second cylindrical segment, wherein the second cylindrical segment has a frustroconical portion comateable with the frustroconical segment of the socket receiving bore and wherein the second cylindrical segment is selectably extendable from and retractable within the housing bore;

d) a sealed first journal bearing formed between an exterior surface of the first cylindrical segment of the pin and the pinhousing bore, wherein the first journal bearing is sealed with a first annular seal at a first end and a second annular seal at a second end and wherein the sealed first journal bearing includes a set of first coplanar arcuate lubricant distribution grooves adjacent the first annular seal and a first continuous annular lubricant collection groove adjacent the second annular seal;

e) a sealed second journal bearing formed between an exterior surface of the second cylindrical section of the pin and the receiving bore of the socket whenever the frustroconical portion of the pin is sealingly comated with the frustroconical segment of the receiving bore, wherein the second journal bearing is sealed with an annular seal at a second end and by the sealingly comated frustroconical portion of the pin and frustroconical segment of the receiving bore at a first end and wherein the second sealed journal bearing includes a set of second coplanar arcuate lubricant distribution grooves adjacent the first end, and a second continuous annular lubricant collection groove adjacent a second end; and f) a lubricant circulation system for the first and second journal bearings having a lubricant reservoir, a first set of lubricant pumps with one pump dedicated to pumping lubricant into each distribution groove of the first set of lubricant distribution grooves, a second set of lubricant pumps with one pump dedicated to pumping lubricant into each distribution groove of the second set of lubricant distribution grooves, a first lubricant return line connecting to the first lubricant collection groove and a second lubricant return line connecting to the second lubricant collection groove;

whereby the first set of lubricant pumps injects pressurized lubricant into the set of first lubricant distribution grooves, through the first journal bearing, and out the first collection groove, and the second set of lubricant pumps injects pressurized lubricant into the set of second lubricant distribution grooves, through the second journal bearing, and out the second collection groove.

14. The lubrication system of claim 13, wherein a sufficient flow of lubricant is provided to the first and second journal bearings to create a hydrostatic bearing in the first and second journal bearings.

15. The lubrication system of claim 13, wherein the lubricant circulation system further comprises a lubricant monitor in communication with the first and second lubricant return lines and the lubricant reservoir, wherein the lubricant monitor compares the lubricant from the first and second lubricant return lines to the lubricant from the lubricant reservoir for compositional variations.

16. The lubrication system of claim 13, wherein the lubricant circulation system further comprises a lubricant monitor in communication with the first and second lubricant return lines, where the lubricant monitor monitors the lubricant from the first and second lubricant return lines for salt or water content.

17. A method of lubricating a pin connection comprising the steps of:
   (a) providing a lubrication system for a pin connection comprising:
      i) a cylindrical pin having a plurality of exterior journaled surfaces,
      ii) a pin housing having a plurality of cylindrical pin-mounting bearing bores,
      iii) a plurality of bearing annuli between the exterior journaled surfaces of the pin and the pin-mounting bearing bores, wherein each bearing annulus is sealed at a first and a second end, and
      iv) a closed lubricant circulation system having a lubricant reservoir, a lubricant pump, a lubricant delivery line, a set of coplanar arcuate lubricant distribution grooves at a first end of each bearing annulus, an annular lubricant collector groove at a second end of each bearing annulus, and a lubricant return line, wherein the lubricant pump induces pressurized lubricant into each lubricant distribution groove, through each bearing annulus, and out each collector groove;
   (b) continuously pumping lubricant from the lubricant reservoir into the set of lubricant distribution groove of each bearing annulus;
   (c) removing the lubricant from each bearing annulus through the annular lubricant collector groove;
   (d) returning the lubricant to the lubricant reservoir;
   (e) providing an independently driven lubricant pump for each of the coplanar arcuate lubricant distribution grooves, each lubricant pump having an output supply line;
   (f) providing an interconnecting flowline to provide fluid communication between the output supply line of each lubricant pump and the lubricant distribution grooves of the bearing annuli; and
   (g) providing a selectably operable on/off valve for each lubricant pump to control fluid communication between each output supply line and the interconnecting flowline.

18. The method of claim 17 further comprising the step of monitoring the lubricant removed from each bearing annulus for salt or water.

19. The method of claim 17, wherein the lubricant from the pump outlet supply lines is comingled.

* * * * *